US012584747B2

(12) United States Patent
Matsudaira et al.

(10) Patent No.: US 12,584,747 B2
(45) Date of Patent: Mar. 24, 2026

(54) STATE ESTIMATION DEVICE AND STATE ESTIMATION METHOD

(71) Applicants:DENSO CORPORATION, Kariya-city (JP); TOYOTA JIDOSHA KABUSHIKI KAISHA, Toyota (JP); MIRISE Technologies Corporation, Nisshin (JP)

(72) Inventors: Nobuaki Matsudaira, Nisshin (JP); Hui Xu, Kariya-city (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 257 days.

(21) Appl. No.: 18/309,225

(22) Filed: Apr. 28, 2023

(65) Prior Publication Data

US 2023/0408261 A1      Dec. 21, 2023

(30) Foreign Application Priority Data

Jun. 16, 2022      (JP) ................................. 2022-097471

(51) Int. Cl.
　　*G01C 21/16*　　　(2006.01)
　　*G06T 7/246*　　　(2017.01)
　　*G06V 10/44*　　　(2022.01)
(52) U.S. Cl.
　　CPC .......... *G01C 21/1656* (2020.08); *G06T 7/246* (2017.01); *G06V 10/44* (2022.01)

(58) Field of Classification Search
　　CPC .. G01C 21/1656; G01C 25/005; G06T 7/246; G06T 2207/30244; G06T 7/73; G06V 10/44
　　See application file for complete search history.

(56) References Cited

U.S. PATENT DOCUMENTS

| | | | | |
|---|---|---|---|---|
| 7,007,676 | B1 * | 3/2006 | Schuricht | ............ F02D 41/2464 |
| | | | | 123/359 |
| 9,424,647 | B2 * | 8/2016 | Flint | .................. G01C 21/1652 |
| 10,527,425 | B1 * | 1/2020 | Jankowski | .......... G01C 21/166 |
| 11,897,486 | B1 * | 2/2024 | Adams | ................. G01C 25/005 |
| 2005/0125142 | A1 | 6/2005 | Yamane | |

(Continued)

FOREIGN PATENT DOCUMENTS

JP      2011-141221 A      7/2011

OTHER PUBLICATIONS

T. Qin, P. Li and S. Shen, "VINS-Mono: A Robust and Versatile Monocular Visual-Inertial State Estimator" in IEEE Transactions on Robotics, vol. 34, No. 4, pp. 1004-1020, Aug. 2018.

*Primary Examiner* — Kito R Robinson
*Assistant Examiner* — Alexander V Gentile
(74) *Attorney, Agent, or Firm* — Posz Law Group, PLC

(57) ABSTRACT

By a state estimation device or a state estimation method, image data is read, a feature point included in the image data is extracted, the feature point is tracked, a position, a velocity, or an attitude of a mobile object is calculated based on inertia data, and a bias error of an inertial measurement unit is calculated. Correction data is calculated by removing the bias error from the inertia data, and a state including at least one of the position, the velocity, or the attitude of the mobile object is estimated based on the correction data.

21 Claims, 21 Drawing Sheets

(56) References Cited

U.S. PATENT DOCUMENTS

| | | | | |
|---|---|---|---|---|
| 2006/0106533 A1 | 5/2006 | Hirokawa | | |
| 2007/0244640 A1 | 10/2007 | Hirokawa | | |
| 2012/0048014 A1* | 3/2012 | Loomis | B60R 11/0241 | |
| | | | | 73/384 |
| 2018/0095476 A1* | 4/2018 | Madsen | A01B 69/001 | |
| 2022/0203998 A1* | 6/2022 | Hosoya | G05D 1/027 | |
| 2023/0117498 A1* | 4/2023 | Alcantarilla | G06V 10/44 | |
| | | | | 382/103 |
| 2023/0249691 A1* | 8/2023 | Urazoe | B60W 40/11 | |
| | | | | 701/70 |

\* cited by examiner

Figure 12:
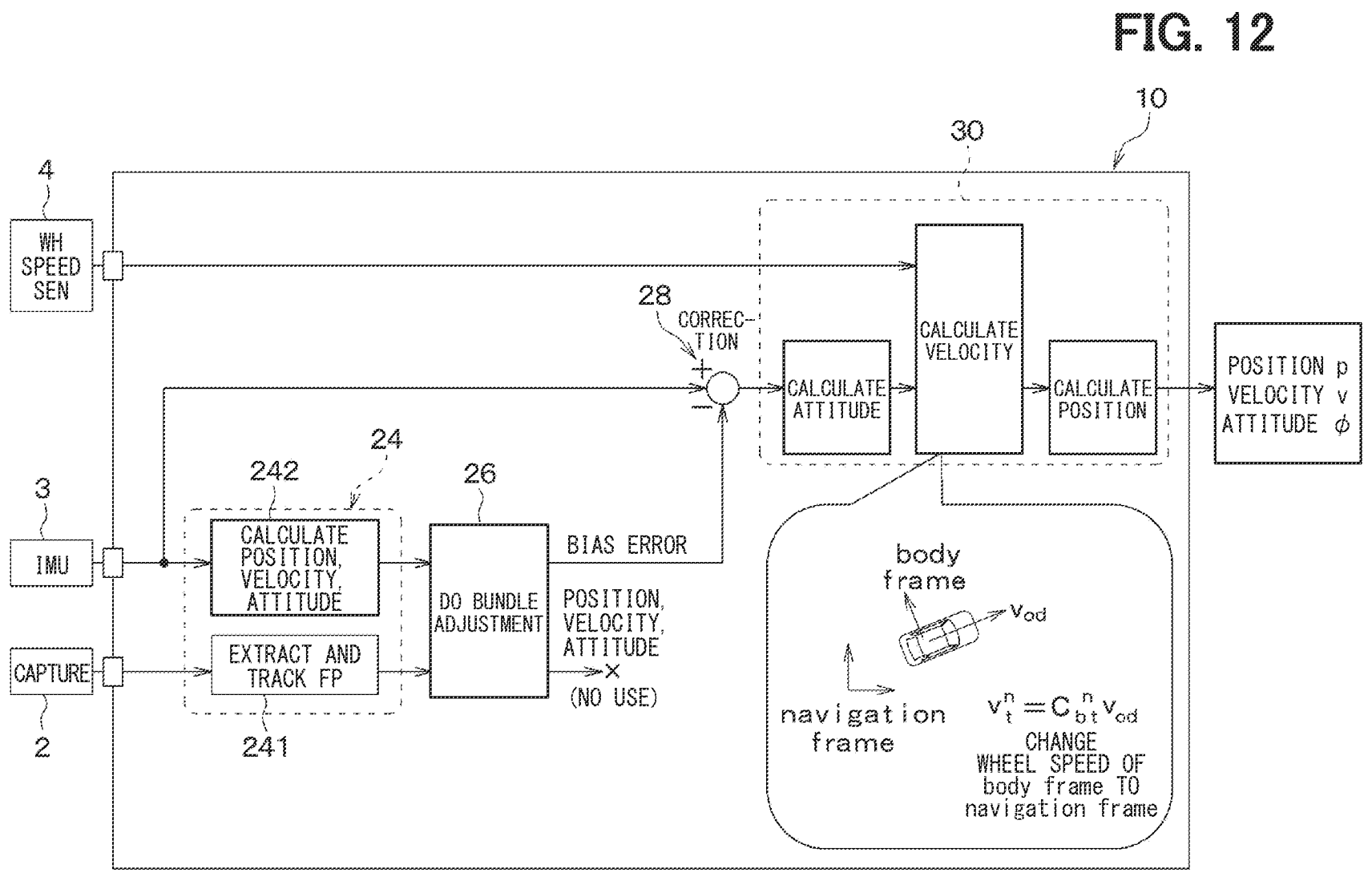

POSITION p
VELOCITY v
ATTITUDE φ

CALCULATE POSITION

CALCULATE VELOCITY

CALCULATE ATTITUDE $$v_t^n = C_{bt}^n v_{od}$$

CHANGE WHEEL SPEED OF body frame TO navigation frame $v_{od}$ body frame navigation frame

28 CORRECTION

+ −

BIAS ERROR

POSITION, VELOCITY, ATTITUDE

X (NO USE)

26 DO BUNDLE ADJUSTMENT

24

242 CALCULATE POSITION, VELOCITY, ATTITUDE

241 EXTRACT AND TRACK FP

4 WH SPEED SEN

3 IMU

2 CAPTURE

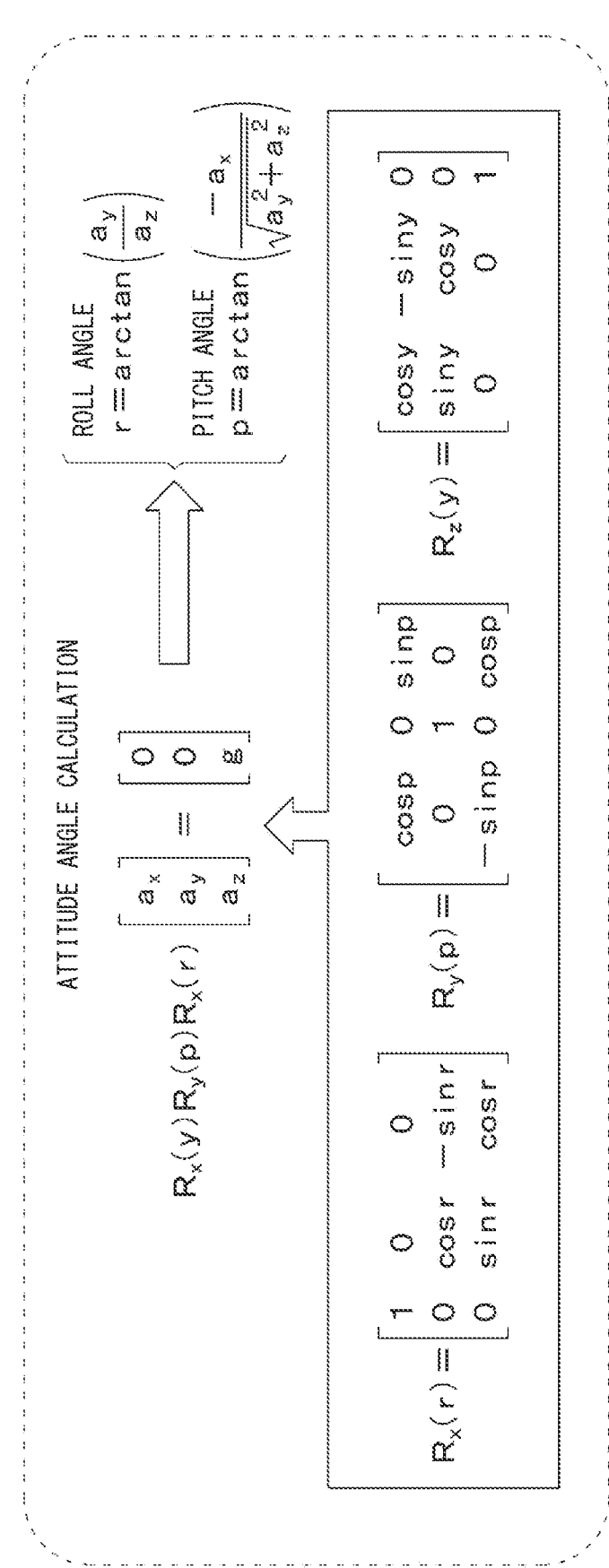

ATTITUDE ANGLE CALCULATION $$R_x(y)R_y(p)R_x(r)\begin{bmatrix} a_x \\ a_y \\ a_z \end{bmatrix} = \begin{bmatrix} 0 \\ 0 \\ g \end{bmatrix}$$

ROLL ANGLE
$$r = \arctan\left(\frac{a_y}{a_z}\right)$$

PITCH ANGLE
$$p = \arctan\left(\frac{-a_x}{\sqrt{a_y^2 + a_z^2}}\right)$$

$$R_x(r) = \begin{bmatrix} 1 & 0 & 0 \\ 0 & \cos r & -\sin r \\ 0 & \sin r & \cos r \end{bmatrix}$$

$$R_y(p) = \begin{bmatrix} \cos p & 0 & \sin p \\ 0 & 1 & 0 \\ -\sin p & 0 & \cos p \end{bmatrix}$$

$$R_z(y) = \begin{bmatrix} \cos y & -\sin y & 0 \\ \sin y & \cos y & 0 \\ 0 & 0 & 1 \end{bmatrix}$$

STATE ESTIMATION DEVICE AND STATE ESTIMATION METHOD

CROSS REFERENCE TO RELATED APPLICATION

The present application claims the benefit of priority from Japanese Patent Application No. 2022-097471 filed on Jun. 16, 2022. The entire disclosure of the above application is incorporated herein by reference.

TECHNICAL FIELD

The present disclosure relates to a state estimation device and a state estimation method for estimating a state including at least one of a position, a speed, or an attitude of a mobile object.

BACKGROUND

Conventionally, there is a technology such as a visual inertial odometry (VIO) that uses a camera and an inertial measurement unit (so-called IMU) to accurately estimates multiple parameters by a nonlinear least-squares method called bundle adjustment. For example, there is a comparative technology of estimating the position, the attitude, the velocity of a mobile object, and a bias error of an inertial measurement unit by the VIO.

SUMMARY

By a state estimation device or a state estimation method, image data is read, a feature point included in the image data is extracted, the feature point is tracked, a position, a velocity, or an attitude of a mobile object is calculated based on inertia data, a bias error of an inertial measurement unit is calculated, correction data is calculated by removing the bias error from the inertia data, and a state including at least one of the position, the velocity, or the attitude of the mobile object is estimated based on the correction data.

BRIEF DESCRIPTION OF DRAWINGS

FIG. 7 is an explanatory diagram illustrating a residual related to prior information.

FIG. 12 is an explanatory diagram illustrating a state estimation device according to a second embodiment.

FIG. 15 is an explanatory diagram illustrating a method of calculating and obtaining a vehicle attitude angle from a sensor output of an acceleration sensor.

FIG. 19 is an explanatory diagram illustrating a state estimation device according to a fifth embodiment.

FIG. 21 is an explanatory diagram illustrating a state estimation device according to a seventh embodiment.

FIG. 23 is an explanatory diagram illustrating a state estimation device according to a ninth embodiment.

DETAILED DESCRIPTION

Figure 1:
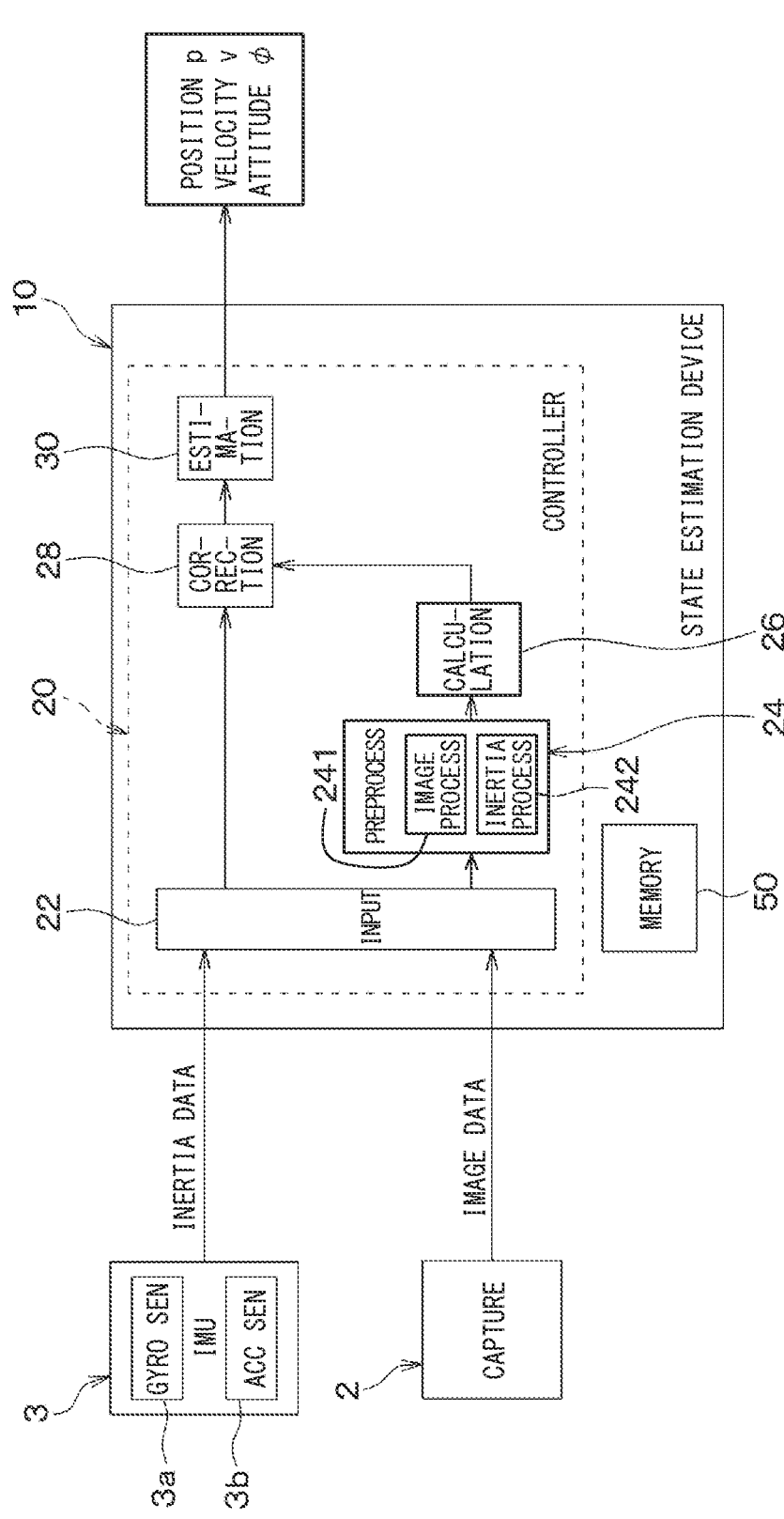
FIG. 1 is a schematic configuration diagram of a state estimation device according to a first embodiment.

As the result of detailed study by the present inventors, it has been found that, when the position, the attitude, the speed of a mobile object such as a vehicle and the bias error of the inertial measurement unit are estimated, an estimation error of the attitude change within a predetermined time from a start time of these estimation is large. A possible reason for this is that an image output by the camera is susceptible to motion blur and movement of surrounding objects, and the error in the attitude obtained based on image data increases in a short period. It should be noted that these have been found by the detailed study by the present inventors.

One example of the present disclosure provides a state estimation device and a state estimation method capable of improving an estimation accuracy of a state including at least one of a position, a speed, or an attitude of a mobile object. According to one example embodiment, a state estimation device for estimating a state including at least one of a position, a velocity, or an attitude of a mobile object. The device includes: an input unit configured to read image data output by a capture unit configured to capture an image of a peripheral area of the mobile object and inertia data of the mobile object, the inertia data being output from an inertial measurement unit installed on the mobile object; a preprocessing unit configured to extract a feature point included in the image data, track the feature point, and calculate the position, the velocity, or the attitude of the mobile object based on the inertia data; a calculation unit configured to calculate a bias error of the inertial measurement unit by performing bundle adjustment on the feature point of the image data, the position, the velocity, or the attitude of the mobile object based on the inertia data; a correction unit configured to calculate correction data by removing the bias error from the inertia data; and an estimation unit configured to estimate a state including at least one of the position, the velocity, or the attitude of the mobile object based on the correction data.

According to the detailed study by the present inventors, it has been found that the estimation error in the attitude change decreases after a certain amount of time has elapsed since the start of attitude change estimation by the VIO. The reason for this is that the attitude estimation result obtained from the image data analysis does not include the bias error of the inertial measurement unit.

In consideration of these, the state estimation device of the present disclosure obtains the bias error from the VIO, and estimates the state of the mobile object based on correction data obtained by removing the bias error from the inertia data.

In this way, when the bias error is estimated by the VIO, and the position, velocity, and attitude of the mobile object are estimated based on the bias error and inertia data, it is possible to reduce the influence of the error due to the motion blur and the peripheral mobile object. Therefore, according to the state estimation device of the present disclosure, it is possible to improve the accuracy of estimating the state including at least one of the position, the velocity, or the attitude of the mobile object.

According to another example embodiment, a state estimation method for estimating a state including at least one of a position, a velocity, or an attitude of a mobile object. The method includes: an input unit configured to read image data output by a capture unit configured to capture an image of a peripheral area of the mobile object and inertia data of the mobile object, the inertia data being output from an inertial measurement unit installed on the mobile object; a preprocessing unit configured to extract a feature point included in the image data, track the feature point, and calculate the position, the velocity, or the attitude of the mobile object based on the inertia data; a calculation unit configured to calculate a bias error of the inertial measurement unit by performing bundle adjustment on the feature point of the image data, the position, the velocity, or the attitude of the mobile object based on the inertia data; calculating correction data by removing the bias error from the inertia data; and estimating a state including at least one of the position, the velocity, or the attitude of the mobile object based on the correction data.

In this way, when the bias error is estimated by the VIO, and the position, velocity, and attitude of the mobile object are estimated based on the bias error and inertia data, it is possible to reduce the influence of the error due to the motion blur and the peripheral mobile object. Therefore, according to the state estimation device of the present disclosure, it is possible to improve the accuracy of estimating the state including at least one of the position, the velocity, or the attitude of the mobile object.

Hereinafter, embodiments of the present disclosure will be described with reference to the drawings. In the following embodiments, components that are the same as or equivalent to those described in the preceding embodiment(s) will be indicated by the same reference symbols, and the description thereof may be omitted. In the following embodiments, when only partial configuration is described in one embodiment, remaining configuration may adopt same configurations as that described in the preceding embodiments. The respective embodiments described herein may be partially combined with each other as long as no particular problems are caused even without explicit statement of these combinations.

First Embodiment

The present embodiment will be described with reference to FIGS. 1 to 11. In the present embodiment, an example will be described in which a state estimation device 10 of the present disclosure shown in FIG. 1 is applied to a vehicle 1 to estimate a position p, a velocity v, and an attitude φ of the vehicle 1 and outputs them to the outside. In the present embodiment, the vehicle 1 corresponds to a "mobile object".

The vehicle 1 is equipped with the state estimation device 10. The vehicle 1 is equipped with a capture unit 2 and an inertial measurement unit 3 in addition to the state estimation device 10. A part of the state estimation device 10 may be placed outside the vehicle 1.

Figure 2:
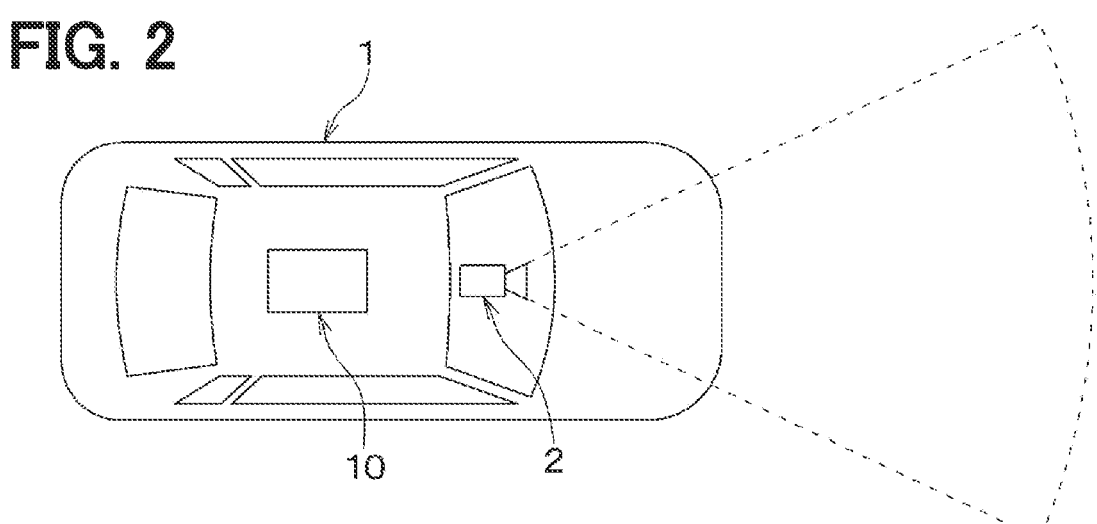
FIG. 2 is an explanatory diagram illustrating a capture unit used by the state estimation device.
Figure 3:
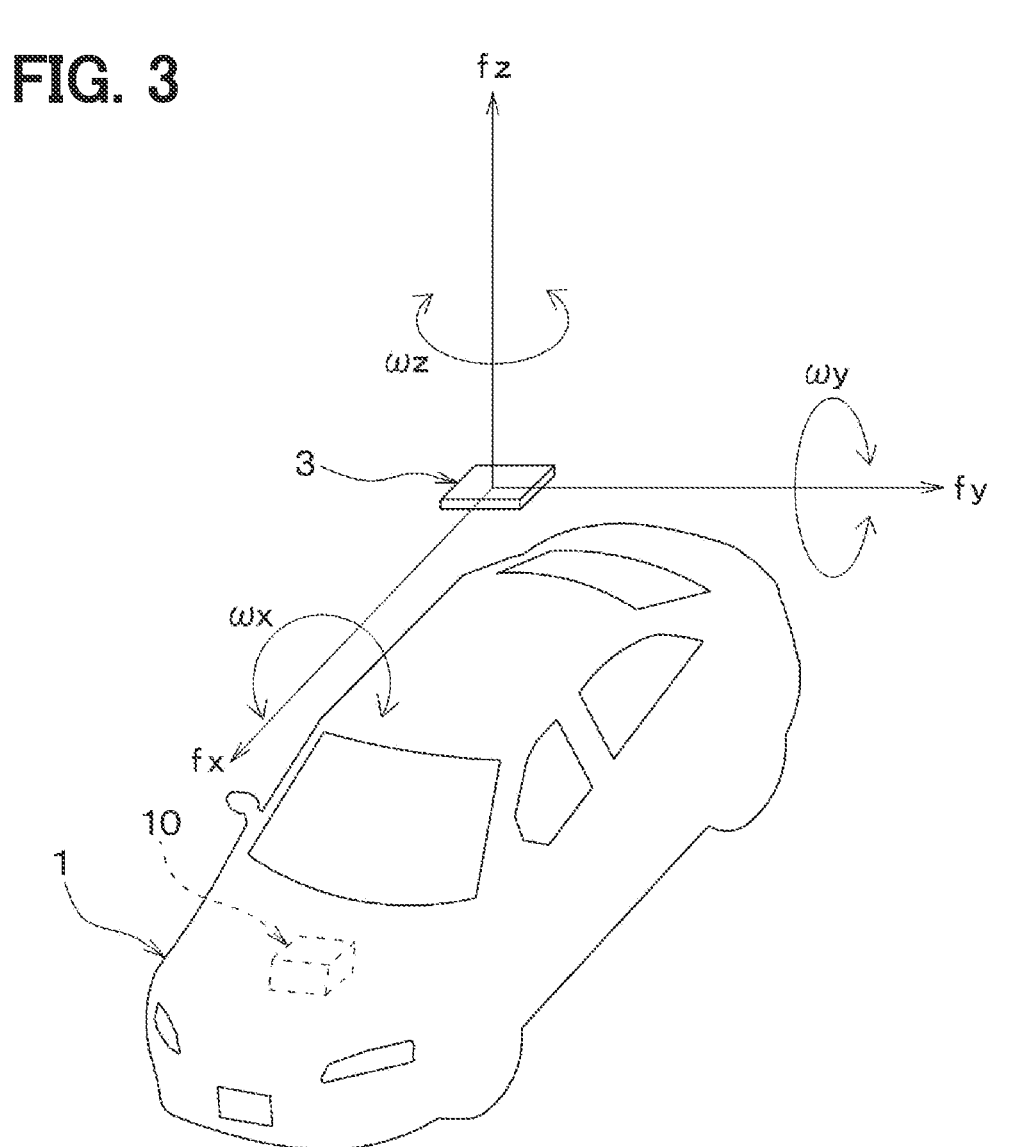
FIG. 3 is an explanatory diagram illustrating an inertial measurement unit used by the state estimation device.

The capture unit 2 periodically captures a peripheral area of the vehicle 1, as shown in FIG. 2. The capture unit 2 outputs image data obtained by capturing the peripheral area of the vehicle 1. The capture unit 2 is configured by, for example, a camera or the like having a photoelectric conversion element such as CCD or CMOS. The CCD is an abbreviation for Charge Coupled Device. The CMOS is an abbreviation for Complementary Metal Oxide Semiconductor. The capture unit 2 of the present embodiment includes a monocular camera. The capture unit 2 may include a compound eye camera.

The inertial measurement unit 3 is a device that detects three-dimensional inertial motion of the vehicle 1. The inertial measurement unit 3 outputs translational motion in orthogonal three-axis directions and rotational motion of the vehicle 1, as inertia data. The inertial measurement unit 3 includes a gyro sensor 3a that detects, as the rotational motion of the vehicle 1, angular velocities $\omega x$, $\omega y$, and $\omega z$ of the vehicle 1 and an acceleration sensor 3b that detects, as the translational motion of the vehicle 1, accelerations fx, fy, and fz of the vehicle 1. In the drawings, the gyro sensor 3a and the acceleration sensor 3b may be also referred to as "GYRO SEN" and "ACC SEN", respectively. The inertial measurement unit 3 of the present embodiment is configured as a small MEMS-based IMU. The MEMS is an abbreviation for Micro Electro Mechanical Systems.

As shown in FIG. 1, the state estimation device 10 estimates the position p, the velocity v, and the attitude φ of the vehicle 1 based on the image data output by the capture unit 2 and the inertia data output by the inertial measurement unit 3, and outputs the estimation result to the outside.

The state estimation device 10 is a computer having a controller 20 including a processor, a memory 50, and the like. The memory 50 stores programs, data, or the like for executing various control processes. The controller 20 executes various programs stored in the memory 50.

The state estimation device 10 functions as various functional units by executing various programs by the controller 20 and the like. The state estimation device 10 includes an input unit 22, a preprocessing unit 24, a calculation unit 26, a correction unit 28, and an estimation unit 30.

The capture unit 2 and the inertial measurement unit 3 are connected to the input unit 22. The input unit 22 reads image data output by the capture unit 2 and the inertia data output by the inertial measurement unit 3.

The preprocessing unit 24 extracts a feature point FP from the image data read by the input unit 22 and tracks the feature point FP, and calculates the position p, the velocity v, and attitude φ of the vehicle 1 based on the inertial data read by the input unit 22.

The preprocessing unit 24 includes an image processing unit 241 that extracts the feature point FP from the image data and tracks the feature point FP. The image processing unit 241, for example, extracts the feature point FP based on local feature amounts by SIFT, SURF, or the like, and correlates the feature point FP extracted from a current image frame by nearest neighbor search or the like to the feature point FP extracted from a previous image frame. The extraction of the feature points FP and the correlation of the feature points FP by the image processing unit 241 may be implemented by means different from those described above.

The preprocessing unit 24 also includes an inertia processing unit 242 that calculates the position p, the velocity v, and the attitude φ of the vehicle 1 based on the inertia data. The inertia processing unit 242 obtains the attitude φ and a rotation matrix Cb of the vehicle 1 by, for example, integrating the angular velocity ω which is the sensor output of the gyro sensor 3a. Further, the inertia processing unit 242 obtains the speed v of the vehicle 1 by integrating the product of the acceleration f, which is the sensor output of the acceleration sensor 3b, and the rotation matrix Cb, and integrates the obtained velocity v of the vehicle 1 to calculate the position p of the vehicle 1. The inertia processing unit 242 obtains three attitude angles such as roll angle, pitch angle, and yaw angle as the attitude φ by calculation.

The calculation unit 26 estimates various parameters including the bias error of the inertial measurement unit 3 using the visual inertial odometry. The calculation unit 26 of the present embodiment performs the nonlinear least-squares method called bundle adjustment on the feature point FP of the image data, the position p, the velocity v, and the attitude φ of the vehicle 1 based on the inertia data to estimate the position p, the attitude φ, the velocity v, and the bias error of the inertial measurement unit 3. The calculation unit 26 estimates each of the bias error of the gyro sensor 3a and the bias error of the acceleration sensor 3b as the bias error of the inertial measurement unit 3.

Figure 4:
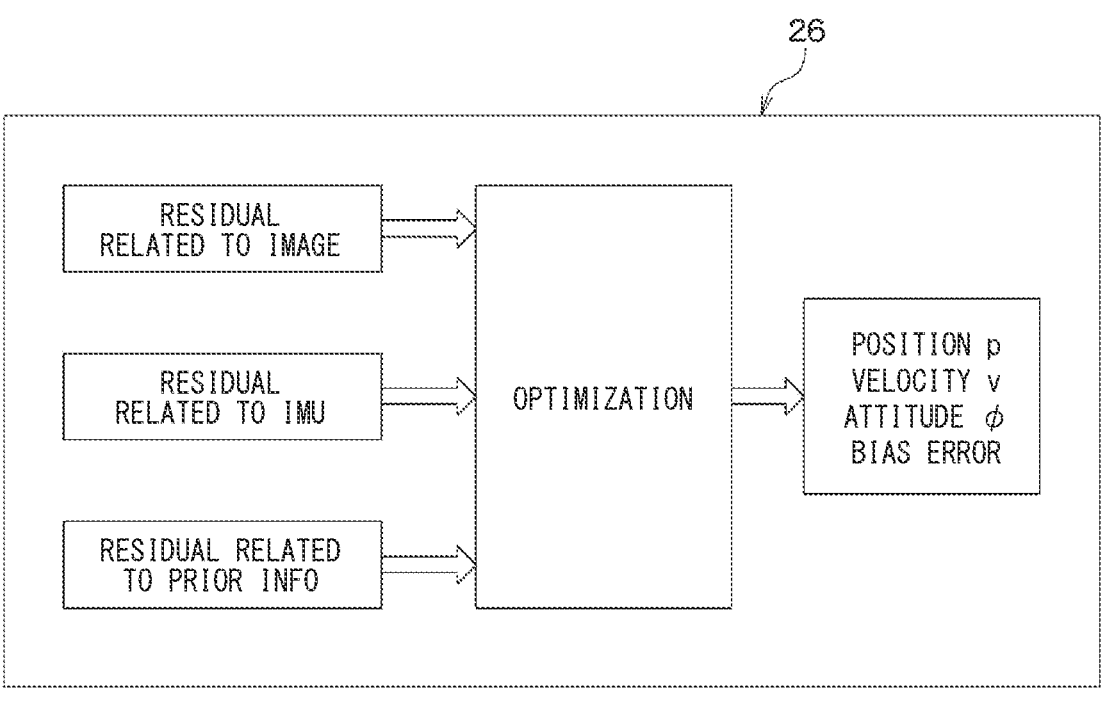
FIG. 4 is an explanatory diagram illustrating an overview of visual inertia odometry.

Specifically, as shown in FIG. 4, the calculation unit 26 optimizes the residuals of the image, the IMU, and the prior information by bundle adjustment to estimate the position p, the attitude φ, the velocity v of the vehicle 1, and the bias error of the inertial measurement unit 3.

Figure 5:
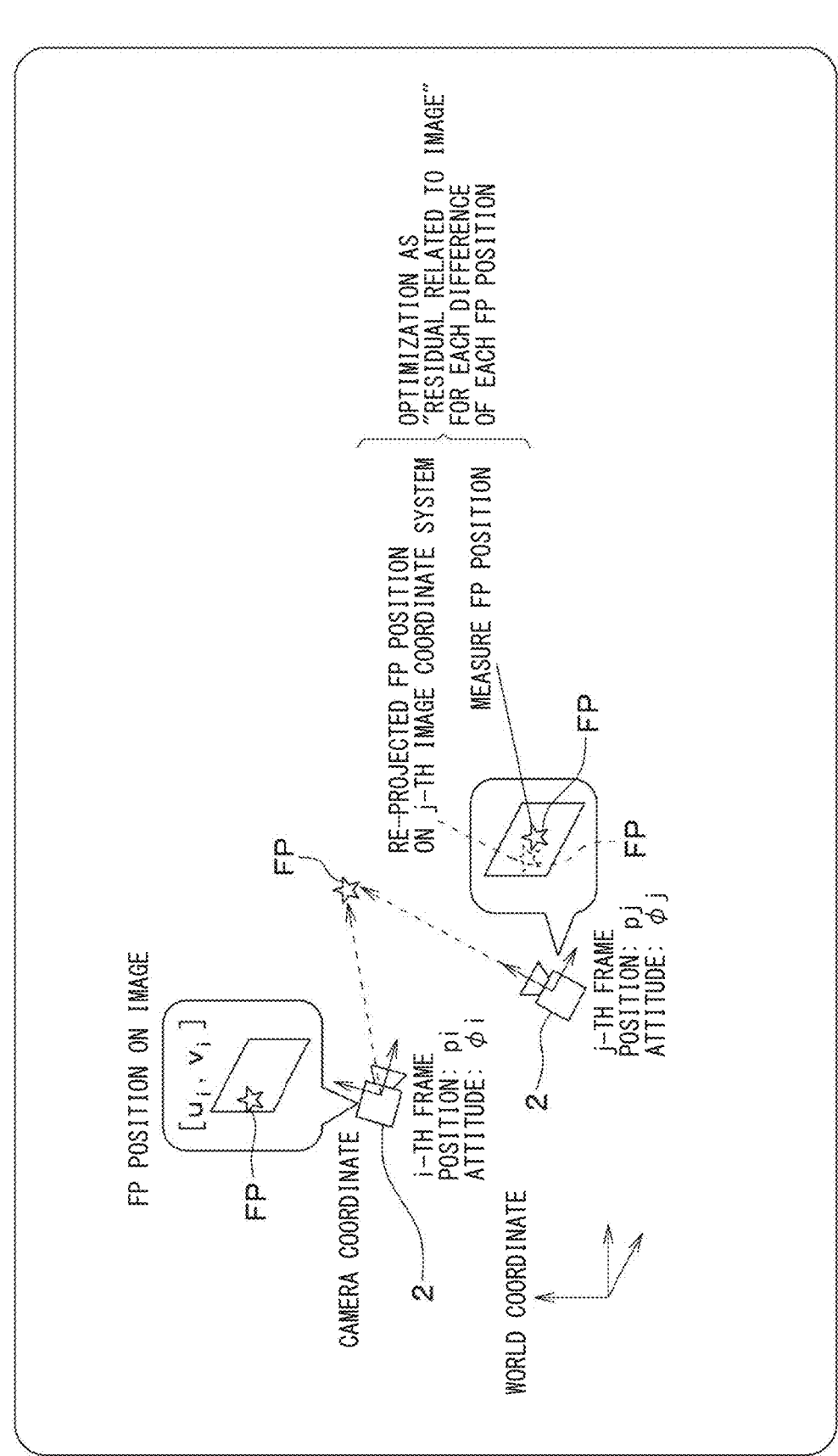
FIG. 5 is an explanatory diagram illustrating a residual related to an image.

The calculation unit 26 optimizes, as a residual for the image, the reprojection error between the image coordinate system and the world coordinate system by bundle adjustment. For example, as shown in FIG. 5, the calculation unit 26 converts the position of the feature point FP in the i-th image frame into the world coordinate system. After that, the calculation unit 26 optimizes, as the residual error related to the image, the difference between the re-projected position on the image coordinate system of the j-th image frame and the position of the feature point FP in the j-th image frame.

Figure 6:
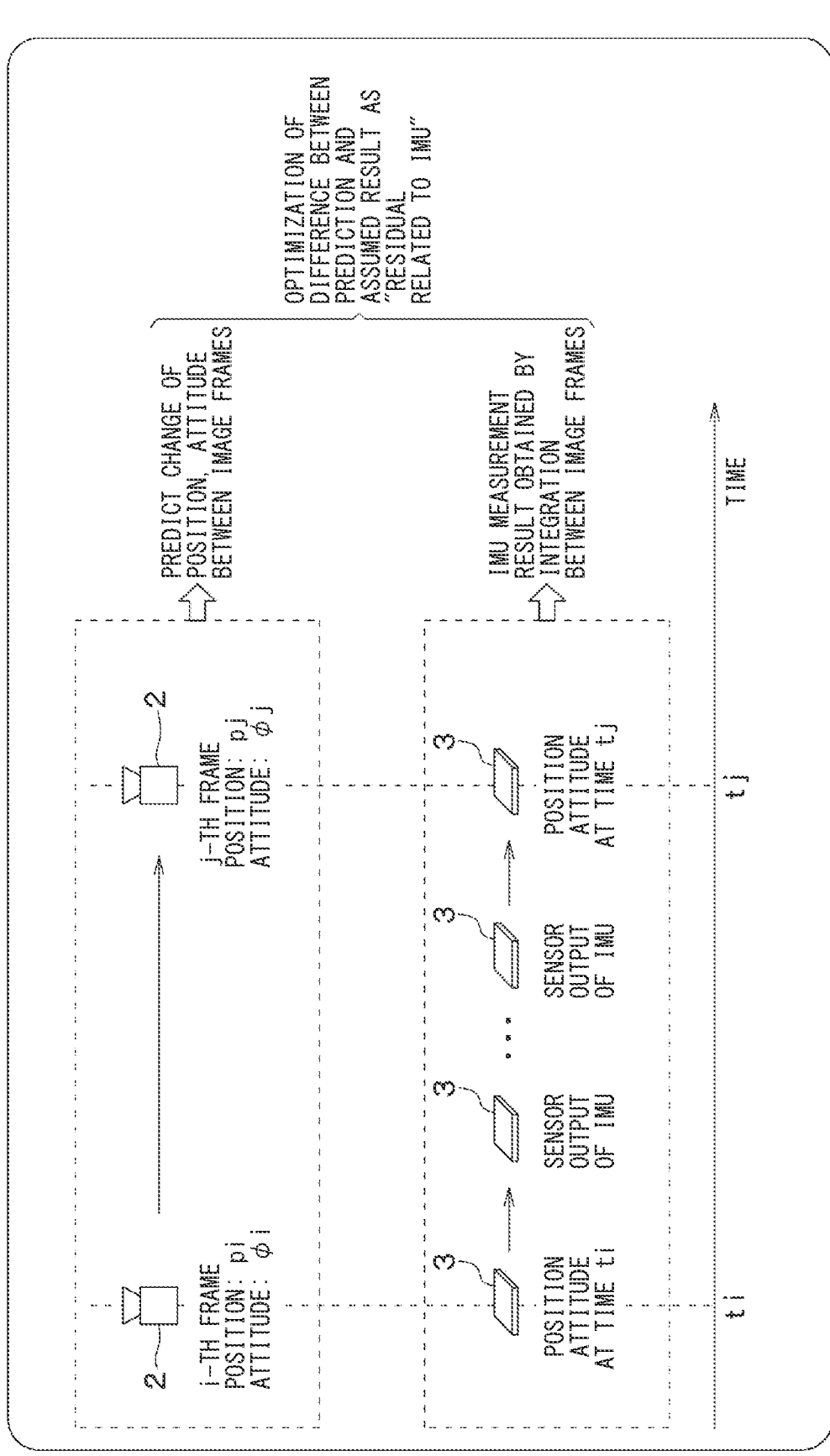
FIG. 6 is an explanatory diagram illustrating a residual related to the inertial measurement unit.

In addition, for example, the calculation unit 26 uses the difference between the measurement results of the position p and the orientation φ by the inertial measurement unit 3 and the prediction results of the position p and the attitude φ predicted from the image data as residuals related to the IMU, and performs optimization using the bundle adjustment. An inertial data sampling time by the inertial measurement unit 3 is shorter than an image data sampling time by the capture unit 2. Therefore, for example, as shown in FIG. 6, the calculation unit 26 uses, as the residual for the IMU, a difference between the prediction results of the changes in the position p and the attitude φ of the vehicle 1 between the i-th image and the j-th image and the measurement results of the position p and the attitude φ obtained by integrating the inertial data acquired between the frames.

Figure 7:
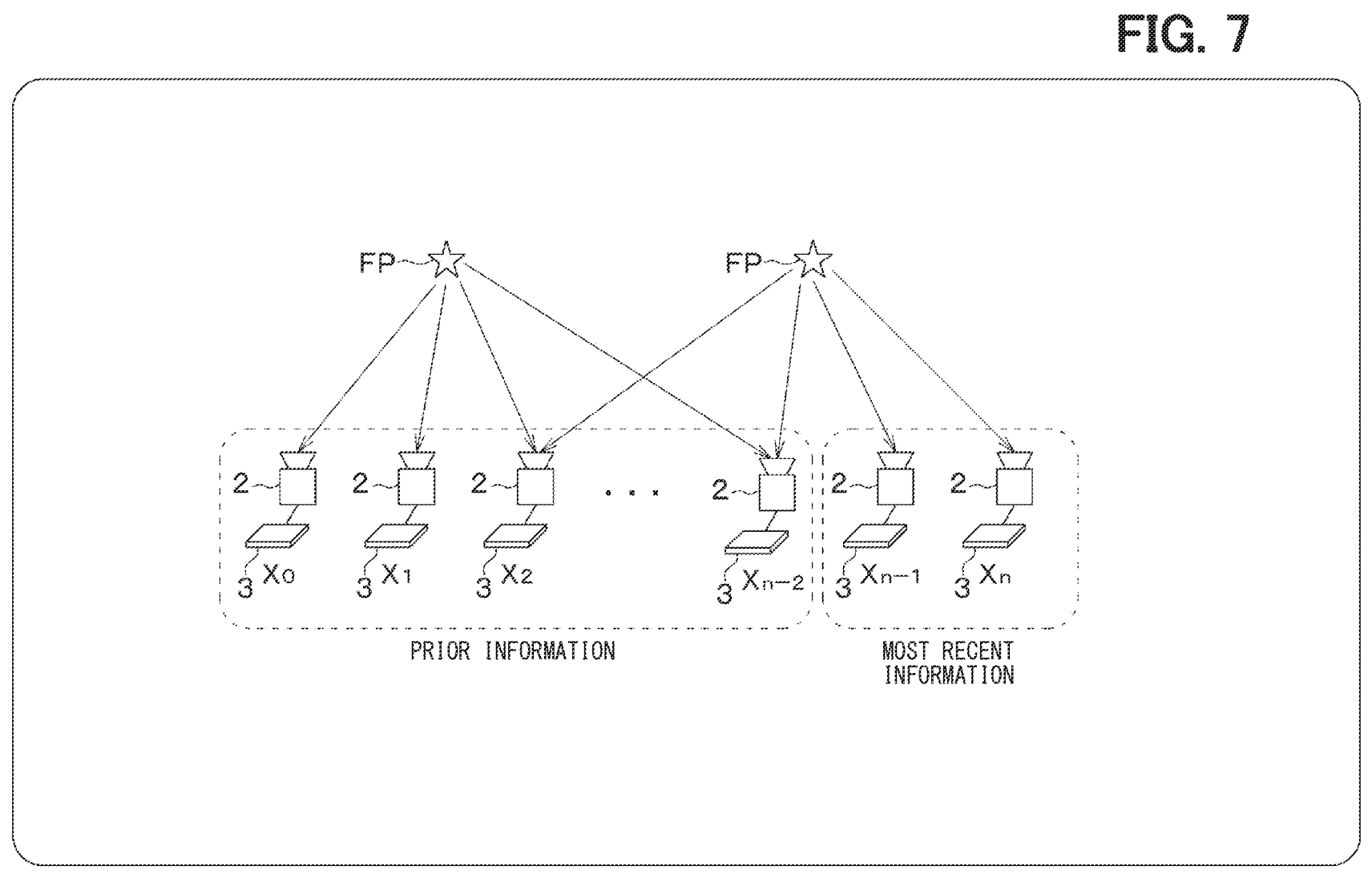

Further, as shown in FIG. 7, the calculation unit 26 performs bundle adjustment on not only the most recent information of the image data and the inertia data, but also prior information. The calculation unit 26 optimizes, as residuals related to the prior information, for example, the difference between the position p and the attitude φ of the vehicle 1 estimated from the most recent information and the position p and the attitude φ of the vehicle 1 estimated from the previous information.

When new information is added, the calculation unit 26 deletes part of the prior information or performs marginalization processing, thereby reducing the load of computation processing and the like. The method of obtaining the position, the velocity v, and the attitude φ in the visual inertia odometry VIO is also disclosed, for example, in Non-Patent Literature of "T. Qin, P. Li and S. Shen, "VINS-Mono: A Robust and Versatile Monocular Visual-Inertial State Estimator," in IEEE Transactions on Robotics, vol. 34, no. 4, pp. 1004-1020, August 2018, doi: 10.1109/TRO.2018.2853729"".

Figure 8:
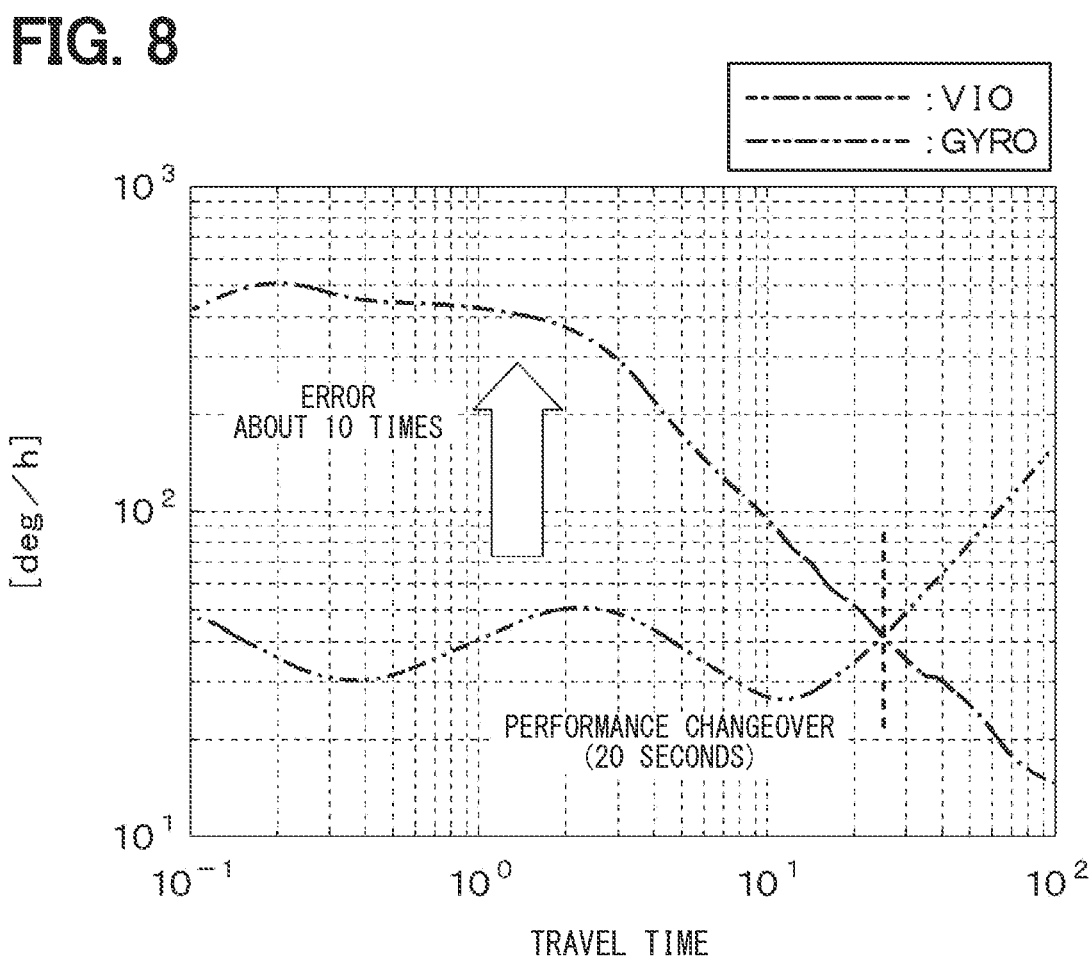
FIG. 8 is an explanatory diagram illustrating an angular velocity estimated from the angular velocity measured by a gyro sensor and the attitude obtained by the visual inertia odometry.

Here, FIG. 8 shows analysis results obtained by performing Allan dispersion on the angular velocity ω measured by the gyro sensor 3a and the angular velocity ω estimated from the attitude φ obtained by the visual inertia odometry. In FIG. 8, the two-dot chain line indicates the analysis result of the angular velocity ω measured by the gyro sensor 3a, and the one-dot chain line indicates the analysis result of the angular velocity ω estimated from the attitude φ obtained by the VIO.

As shown in FIG. 8, it was found that the estimation of the angular velocity ω by the VIO has a larger error within a predetermined time after the start of the estimation than the measurement result of the gyro sensor 3a. A possible reason for this is that image data output by the capture unit 2 is susceptible to motion blur and the peripheral mobile object, and the error in the attitude φ obtained by the analysis of the image data increases in a short period.

On the other hand, the estimation of the angular velocity ω by the VIO reduces the error over time. The reason for this is considered to be that the estimation of the angular velocity ω by the VIO is not affected by the bias error of the gyro sensor 3a.

Figure 9:
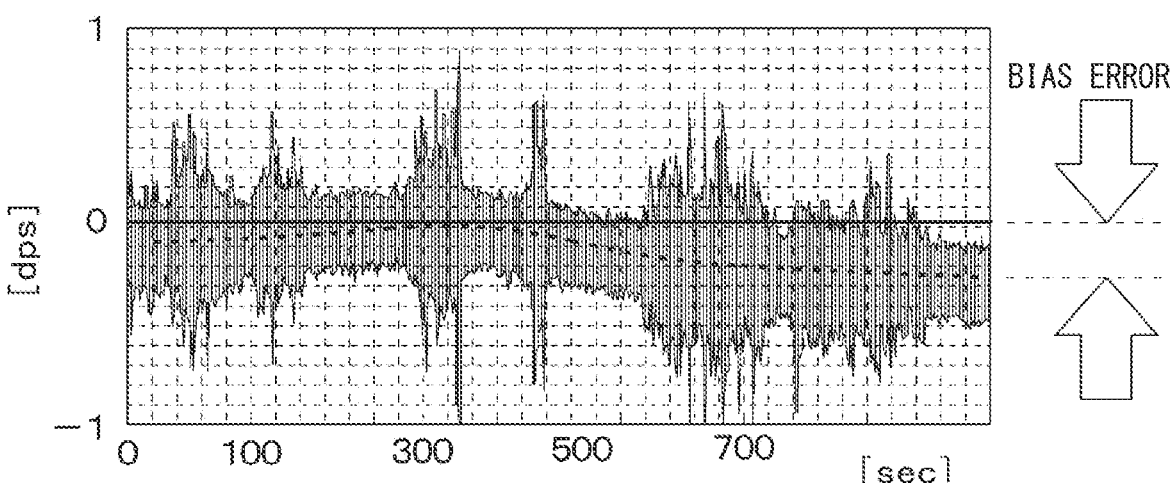
FIG. 9 is an explanatory diagram illustrating temporal changes in bias error included in inertia data.

On the other hand, as shown in FIGS. 8 and 9, the error in the measurement result of the gyro sensor 3a is small until a certain amount of time has elapsed since the start of measurement, but the error gradually increases with the passage of time. The reason for this is considered to be the accumulation of bias errors over time.

In consideration of these characteristics, the state estimation device 10 obtains the bias error from the VIO, and estimates the state of the vehicle 1 based on correction data obtained by removing the bias error from the inertia data. The state estimation device 10 of the present embodiment includes the correction unit 28 that obtains the correction data obtained by removing the bias error from the inertia data, and the estimation unit 30 that estimates at least one of the position p, the velocity v, or the attitude φ of the vehicle 1 based on the correction data.

Figure 10:
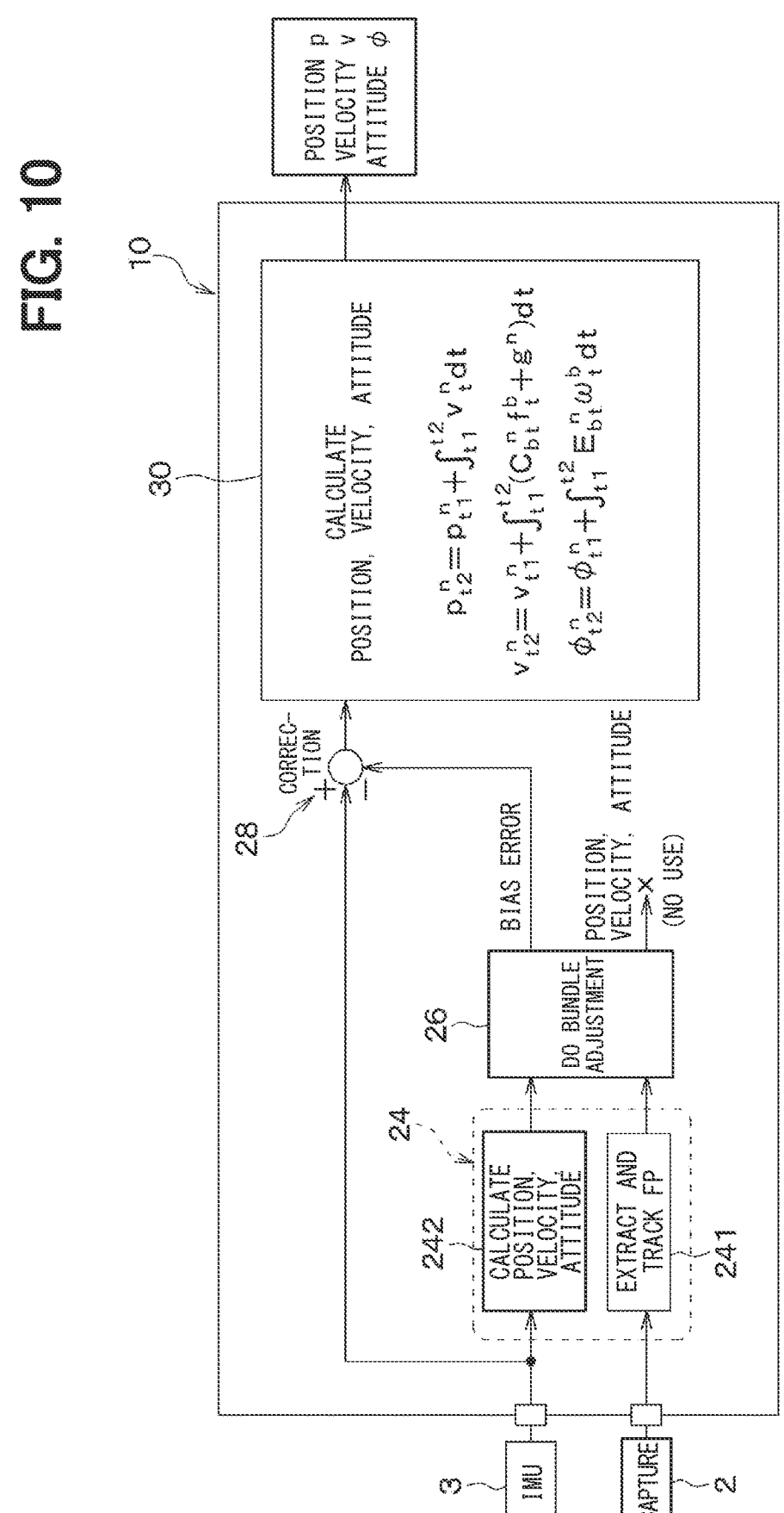
FIG. 10 is an explanatory diagram illustrating a state estimation device according to the first embodiment.

For example, as shown in FIG. 10, the correction unit 28 outputs, as correction data, data obtained by subtracting the bias error of the inertial measurement unit 3 obtained by the VIO from the inertial data output from the inertial measurement device 3.

The estimation unit 30 calculates the position p, the velocity v, and the attitude φ of the vehicle 1 based on the correction data, and outputs the calculation results. The estimation unit 30 integrates the angular velocity ω corrected by the correction unit 28 to obtain the attitude φ of the vehicle 1 and the rotation matrix Cb. Further, the estimation unit 30 obtains the velocity v of the vehicle 1 by integrating the product of the acceleration f corrected by the correction unit 28 and the rotation matrix Cb, and integrates the velocity v of the vehicle 1 to obtain the position p of the vehicle 1.

Figure 11:
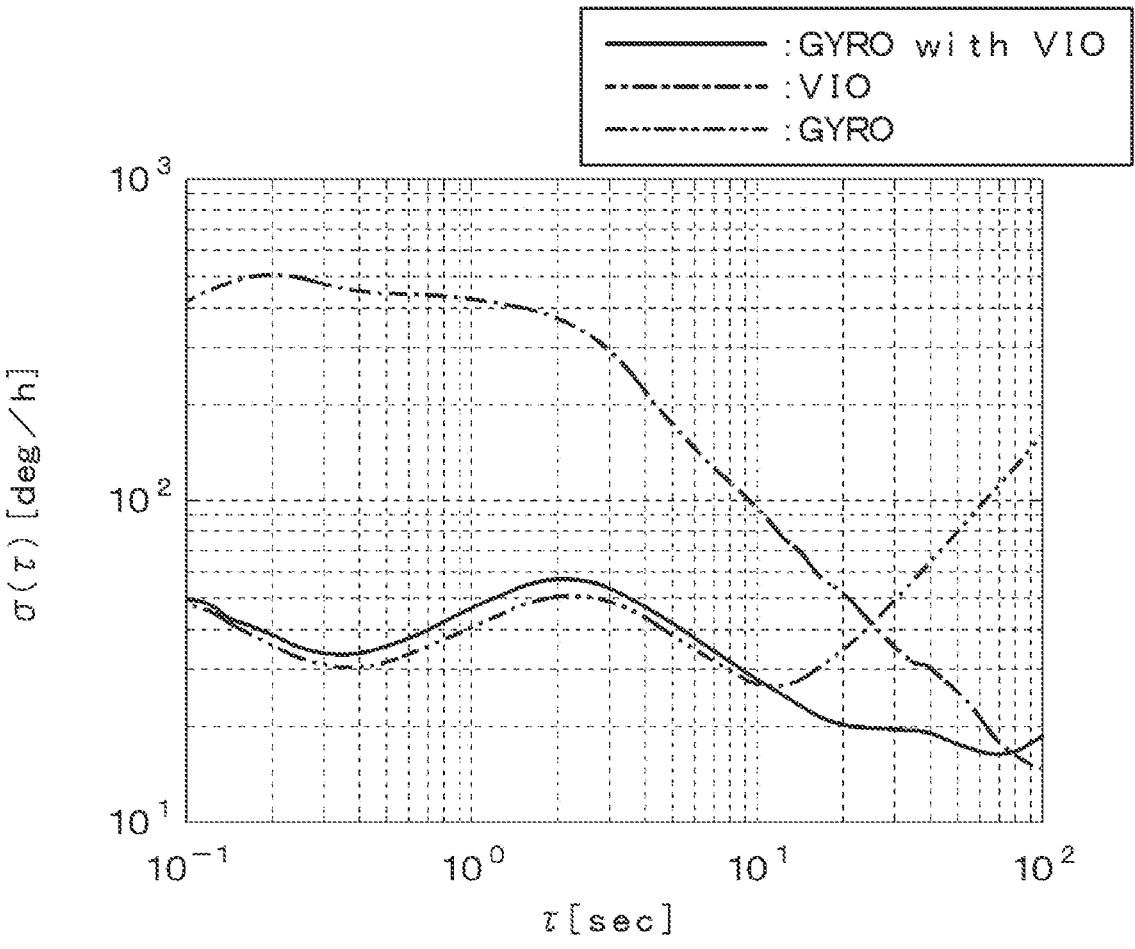
FIG. 11 is an explanatory diagram illustrating estimation results of a vehicle attitude based on correction data calculated from the bias error obtained by the visual inertia odometry and the inertia data.

Here, FIG. 11 shows analysis results obtained by performing Allan dispersion on the angular velocity ω measured by the gyro sensor 3*a*, the angular velocity ω estimated from the attitude φ obtained by the VIO, and the angular velocity ω obtained by removing the bias error from the angular velocity ω measured by the gyro sensor 3*a*. In FIG. 11, the two-dot chain line indicates the analysis result of the angular velocity ω measured by the gyro sensor 3*a*, and the one-dot chain line indicates the analysis result of the angular velocity ω estimated from the attitude φ obtained by the VIO. Further, in FIG. 11, the solid line indicates the analysis result of the angular velocity ω obtained by removing the bias error from the angular velocity ω measured by the gyro sensor 3*a*.

As shown in FIG. 11, the angular velocity ω obtained by removing the bias error from the angular velocity ω measured by the gyro sensor 3*a* is different from the angular velocity ω estimated from the attitude φ obtained by the VIO, and has the smaller error immediately after the start of estimation. Further, the angular velocity ω obtained by removing the bias error from the angular velocity ω measured by the gyro sensor 3*a* showed a small error even after a certain amount of time elapsed, unlike the measurement result of the gyro sensor 3*a*.

The state estimation device 10 and the state estimation method described above obtain the bias error by the VIO, and estimates the position p, the velocity v, and the attitude φ of the vehicle 1 based on correction data obtained by removing the bias error from the inertia data. In this way, when the bias error is estimated by the VIO, and the position p, velocity v, and attitude φ of the vehicle 1 are estimated based on the bias error and inertia data, it is possible to reduce the influence of the error due to the motion blur and the peripheral mobile object. Therefore, according to the state estimation device 10 and the state estimation method of the present disclosure, it is possible to improve the accuracy of estimating the state including at least one of the position p, the velocity v, or the attitude φ of the vehicle 1.

Here, the VIO does not sequentially estimate the current state from the past measurement results and the current measurement results like the Kalman filter, but minimizes the error by the nonlinear least-squares method such as bundle adjustment. Although the bundle adjustment requires a large computational load, it is characterized by high accuracy because the bundle adjustment uses multiple data from the past to the present to obtain the estimation value that minimizes the error through iterative calculations. In particular, the bundle adjustment has better performance than the Kalman filter in terms of resistance to disturbance noise and state estimation using nonlinear functions. Since the state estimation device 10 and the state estimation method of the present disclosure use the bias error highly accurately estimated by the VIO, it is possible to appropriately correct the inertial data. This is effective in improving the accuracy of estimating the state including at least one of the position p, the velocity v, or the attitude φ of the vehicle 1.

Second Embodiment

Next, a second embodiment will be described with reference to FIG. 12. In the present embodiment, differences from the first embodiment will be mainly described.

As in the first embodiment, when the capture unit 2 includes the monocular camera, the scale estimation error is larger than when the compound eye camera is used. When this error is large, the accuracy of estimating the bias error of the acceleration f included in the inertia data may decrease. Even when the velocity v or the position p of the vehicle 1 is estimated by integrating a value obtained by removing the bias error from the acceleration f in the inertia data, there is a possibility that a sufficient accuracy improvement effect cannot be obtained.

In consideration of this, as shown in FIG. 12, the state estimation device 10 of the present embodiment uses not only the inertia data from which the bias error has been removed, but also the sensor output of the wheel speed sensor 4 to obtain position p and the velocity v of the vehicle 1. The wheel speed sensor 4 includes, for example, a rotary encoder. The wheel speed sensor 4 outputs a signal corresponding to the number of rotations of the wheels of the vehicle 1 to the outside as a sensor output.

The estimation unit 30 is directly or indirectly connected to the wheel speed sensor 4 so as to read the sensor output of the wheel speed sensor 4. The estimation unit 30 estimates the velocity v and the position p of the vehicle 1 based on the correction data obtained by the correction unit 28 and the sensor output of the wheel speed sensor 4 as well.

Specifically, the estimation unit 30 integrates the angular velocity ω corrected by the correction unit 28 to obtain the attitude φ of the vehicle 1 and the rotation matrix Cb. Further, the estimation unit 30 obtains the velocity v of the vehicle 1 by integrating the product of the acceleration f, which is not corrected by the correction unit 28 but estimated from the output of the wheel sensor 4, and the rotation matrix Cb, and integrates the velocity v of the vehicle 1 to obtain the position p of the vehicle 1.

Others are the same as those in the first embodiment. The state estimation device 10 and the state estimation method of the present embodiment can obtain the similar effects to those of the first embodiment, which are provided by the common configuration or the equivalent configuration to the first embodiment.

Further, the state estimation device 10 of the present embodiment has the following features.

(1) The estimation unit 30 of the state estimation device 10 obtains the speed v of the vehicle 1 based on the correction data and the sensor output of the vehicle wheel speed sensor 4 installed in the vehicle 1, and estimates the position p of the vehicle 1 based on the obtained velocity v of the vehicle 1. According to this, even when the capture unit 2 includes the monocular camera, it is possible to estimate the velocity v and the position p of the vehicle 1 with sufficient accuracy. The configuration according to the present disclosure is suitable for a configuration in which the monocular camera is used as the capture unit 2 and a configuration in which it is difficult to reduce an error in the scale estimation of the camera.

Third Embodiment

Next, a third embodiment will be described with reference to FIGS. 13 to 15. In the present embodiment, differences from the first embodiment will be mainly described.

In the inertial measurement unit 3, the acceleration sensor 3*b* has a simpler structure than the gyro sensor 3*a* in terms of sensor structure such as MEMS, and the bias change of the acceleration sensor 3*b* tends to be smaller than the bias change of the gyro sensor 3*a*. In line with such a fact, the bias error estimated by the VIO tends to be less accurate with the gyro sensor 3a than with the acceleration sensor 3b.

Figure 13:
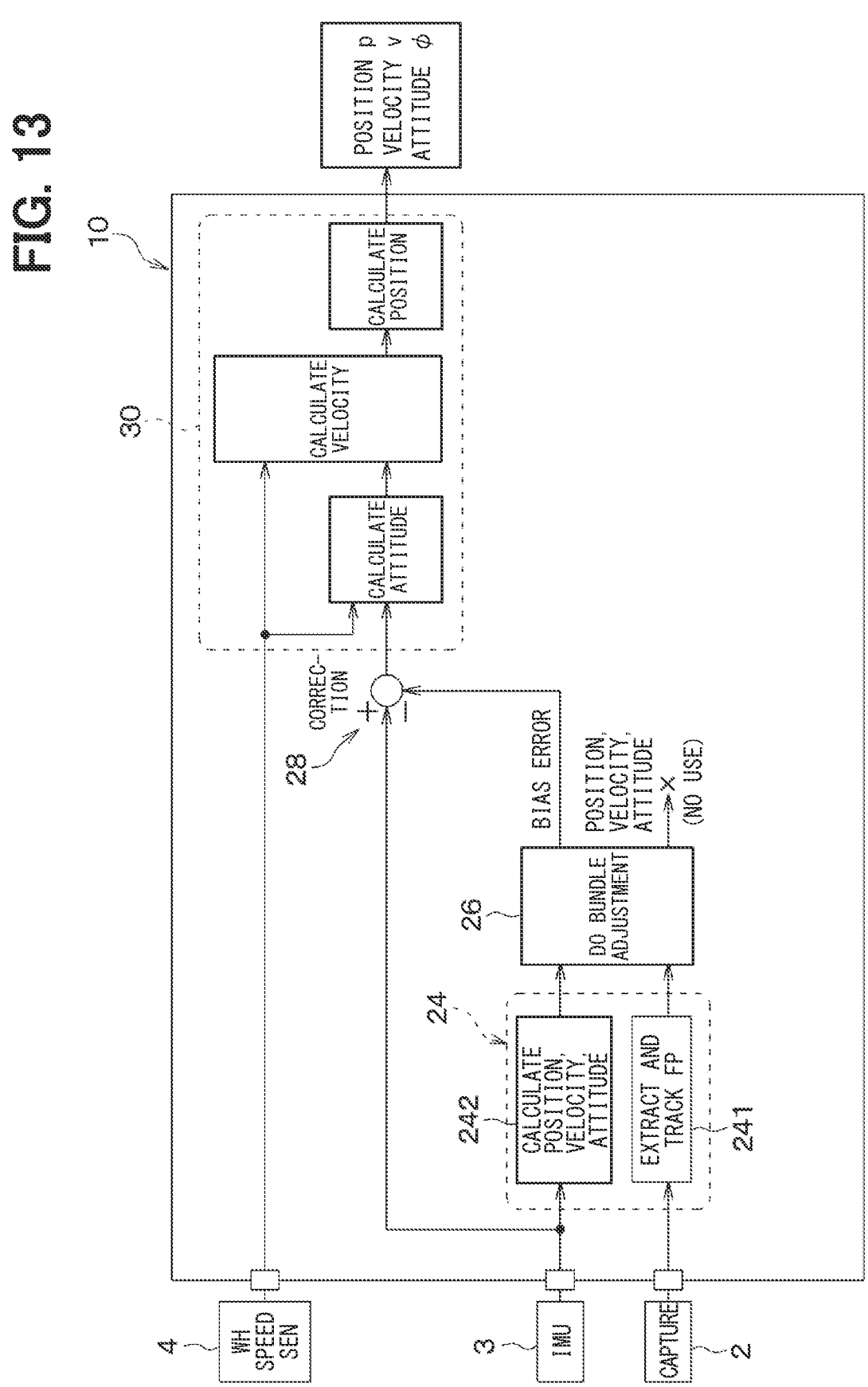
FIG. 13 is an explanatory diagram illustrating a state estimation device according to a third embodiment.

Based on these, as shown in FIG. 13, the state estimation device 10 of the present embodiment estimates the attitude $\varphi$ of the vehicle 1 by using the sensor output of the wheel sensor 4 in addition to the correction data obtained by correcting the inertia data with used of the bias error obtained by the VIO.

Figure 14:
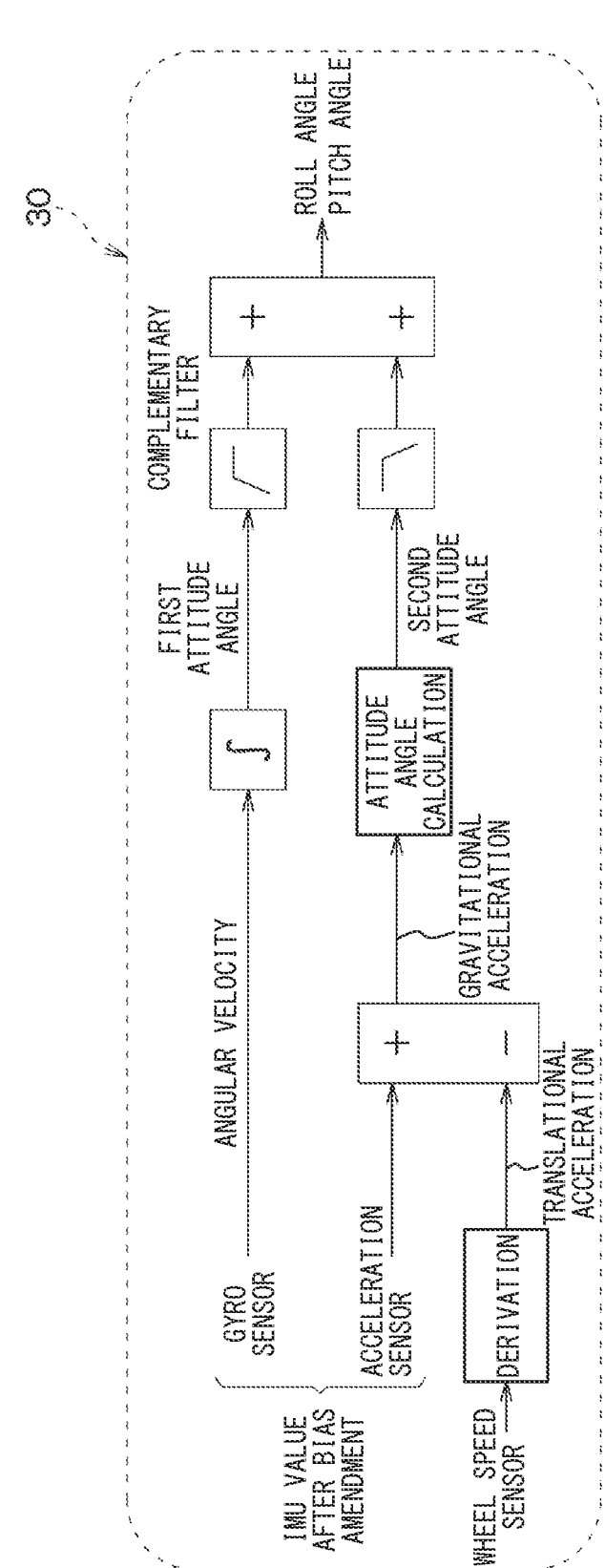
FIG. 14 is an explanatory diagram illustrating an estimation method of a vehicle attitude in the state estimation device according to the third embodiment.

As shown in FIG. 14, the estimation unit 30 obtains the bias error of the gyro sensor 3a by using the VIO, and calculates a first attitude angle $\varphi1$ indicating the attitude $\varphi$ of the vehicle 1 based on the output obtained by correcting the sensor output of the gyro sensor 3a using the bias error.

The estimation unit 30 also calculates the bias error of the acceleration sensor 3b by the VIO. Then, the estimation unit 30 calculates a second attitude angle $\varphi2$ indicating the attitude $\varphi$ of the vehicle 1 based on the output obtained by correcting the sensor output of the acceleration sensor 3b with use of the bias error of the acceleration sensor 3b and a gravitational acceleration obtained from the sensor output of the wheel speed sensor 4.

Specifically, the estimation unit 30 removes the translational acceleration from the sensor output of the acceleration sensor 3b using a derivation value of the sensor output of the wheel speed sensor 4. After extracting only the gravitational acceleration, the estimation unit 30 calculates the attitude angle as shown in FIG. 15 to obtain the second attitude angle $\varphi2$ indicating the attitude $\varphi$ of the vehicle 1.

Here, since the wheel speed sensor 4 has large quantization noise, it is preferable to limit the band with a low-pass filter when using the wheel speed sensor 4. For example, it is preferable that the second attitude angle $\varphi2$ obtained by the estimation unit 30 is smoothed by a moving average filter, and only low frequency components are used. In this case, although the high frequency component is insufficient, the first attitude angle $\varphi1$ may be used for the insufficient high frequency component.

In consideration of these, the estimation unit 30 passes the first attitude angle $\varphi1$ through a high-pass filter of a complementary filter and passes the second attitude angle $\varphi2$ through a low-pass filter of the complementary filter, and synthesizes them to estimate the attitude $\varphi$ of the vehicle 1. As for the complementary filters, it is desirable that the orders of the cutoff frequencies of the low-pass filter and the high-pass filter match.

Others are similar to the embodiments described above. The state estimation device 10 and the state estimation method of the present embodiment can obtain similar effects to those of the above-described embodiments, which are provided by the common configuration or the equivalent configuration to the above-described embodiments.

Further, the state estimation device 10 of the present embodiment has the following features.

(1) The estimation unit 30 passes the first attitude angle $\varphi1$ through a high-pass filter of a complementary filter and passes the second attitude angle $\varphi2$ through a low-pass filter of the complementary filter, and synthesizes them to estimate the attitude $\varphi$ of the vehicle 1. In this manner, it is possible to sufficiently improve the accuracy of estimating the attitude $\varphi$ of the vehicle 1 by the configuration of estimating the attitude $\varphi$ of the vehicle 1 by using the second attitude angle $\varphi2$ estimated from the sensor output of the acceleration sensor 3b in addition to the first attitude angle $\varphi1$ estimated from the sensor output of the gyro sensor 3a.

Fourth Embodiment

Figure 16:
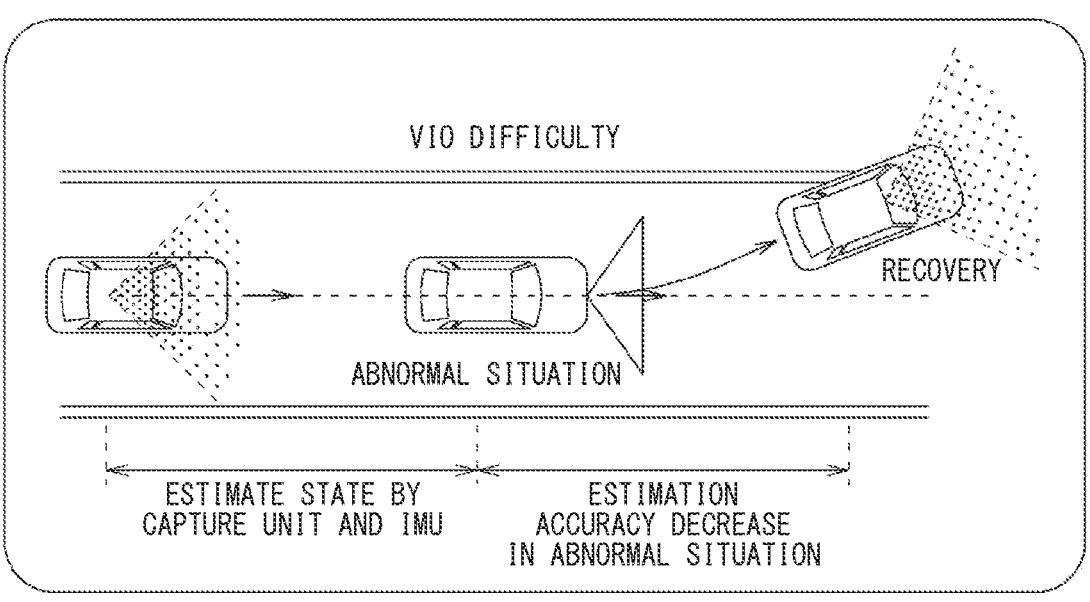
FIG. 16 is an explanatory diagram illustrating a difficulty in an abnormal situation.

Next, a fourth embodiment will be described with reference to FIGS. 16 to 18. In the present embodiment, differences from the first embodiment will be mainly described.

When there is a change in the environment around the vehicle 1 (for example, backlight, tunnel, or the like), it becomes difficult for the capture unit 2 to perform its intended function. When such an abnormal situation occurs, for example, as shown in FIG. 16, the estimation of the bias error by the VIO becomes unstable, and it becomes difficult to estimate the position p, the velocity v, and the attitude $\varphi$ of the vehicle 1 with high accuracy.

Figure 17:
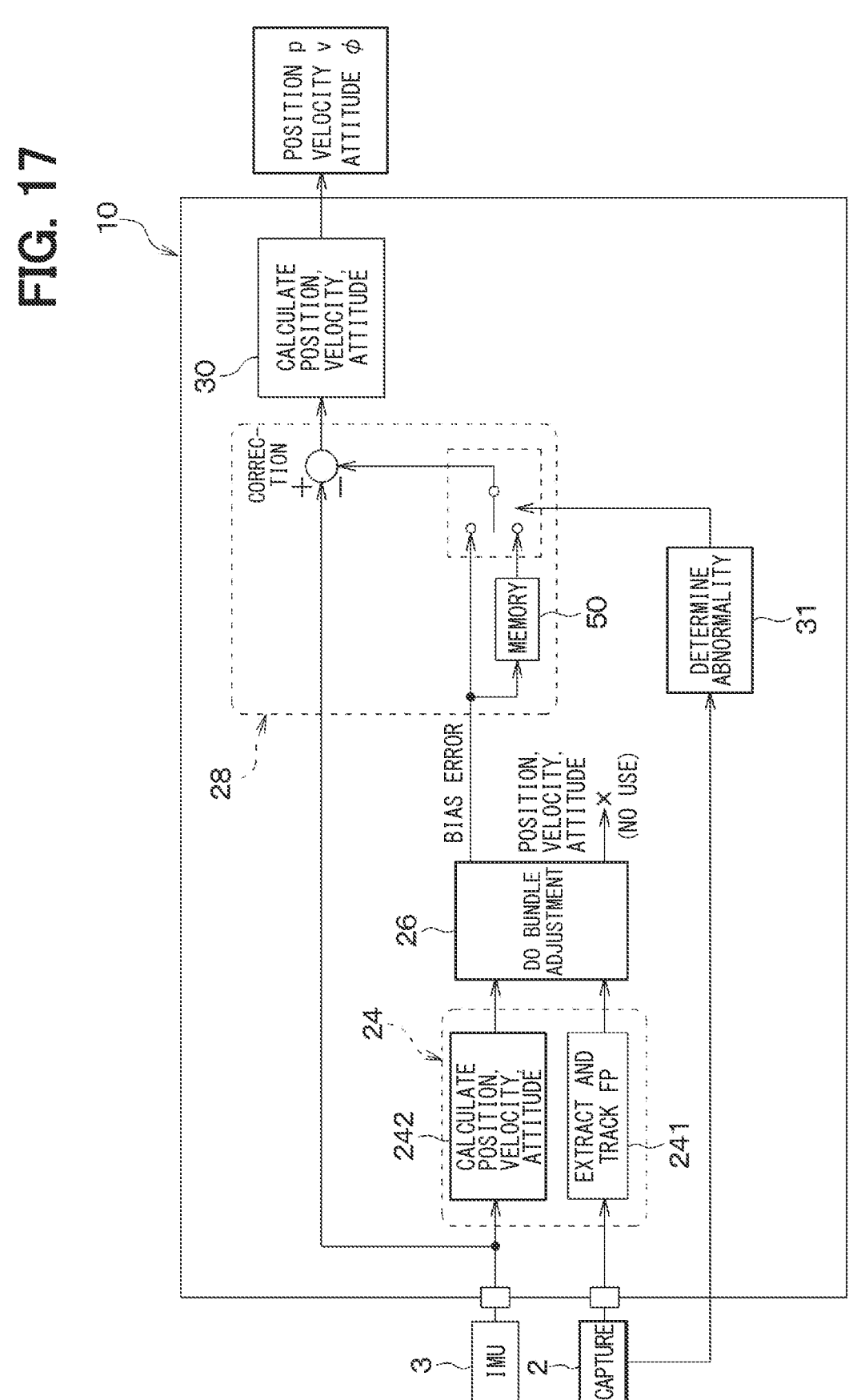
FIG. 17 is an explanatory diagram illustrating a state estimation device according to a fourth embodiment.
Figure 18:
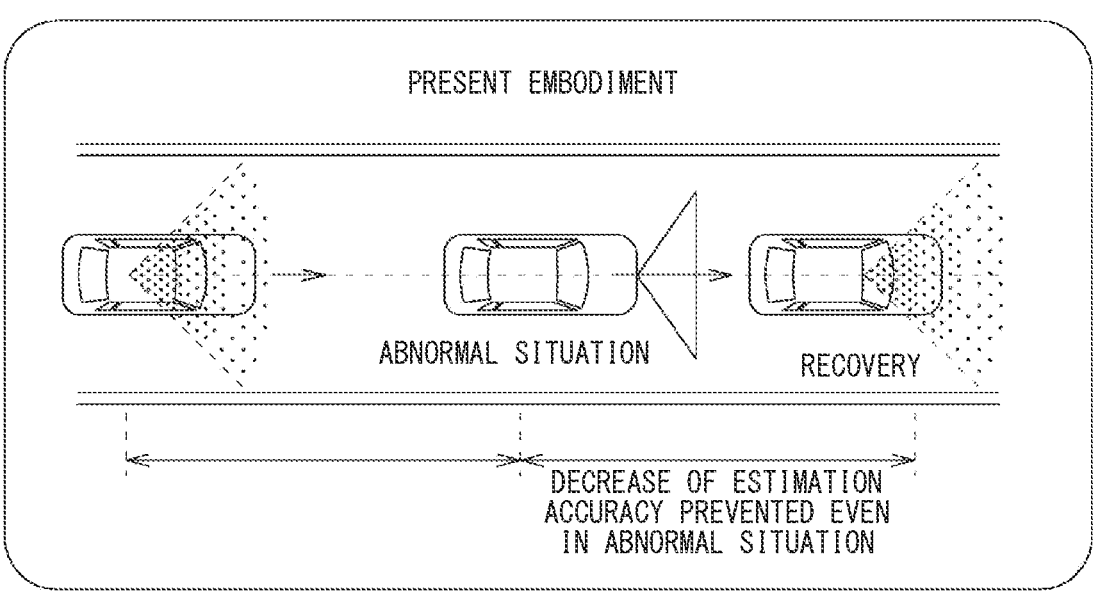
FIG. 18 is an explanatory diagram illustrating behavior under an abnormal situation.

In view of this, as shown in FIG. 17, the state estimation device 10 includes an abnormality determination unit 31 that determines whether there is an abnormal situation in which it is difficult for the capture unit 2 to perform its intended function.

The abnormality determination unit 31 determines, for example, based on the image data output by the capture unit 2, whether the imaging unit 2 can perform the intended function such as extraction of the feature point FP. The abnormality determination unit 31 determines that the situation is not abnormal when the capture unit 2 can perform the intended function. The abnormality determination unit 31 determines that the situation is abnormal when the capture unit 2 cannot perform the intended function.

The correction unit 28 of the present embodiment calculates correction data of the inertia data in consideration of the determination result of the abnormality determination unit 31. Specifically, when the capture unit 2 is in a normal state in which it can perform its intended function, the correction unit 28 removes the bias error obtained by the VIO from the inertia data to calculate correction data.

On the other hand, when the capture unit 2 is not in the abnormal situation where the intended function cannot be performed, the correction unit 28 calculates the correction data by removing, instead of the bias error obtained by the VIO, the bias estimation value previously stored in the memory 50 from the inertia data.

Here, the bias error changes depending on stress, temperature, and the like. However, these do not change much in a short time (for example, about 10 seconds). For this reason, for example, it is desirable that the correction unit 28 stores the bias error obtained by the VIO immediately before the capture unit 2 becomes in the abnormal situation in which it cannot perform its intended function as the bias estimation value in the memory 50.

Others are the similar to the embodiments described above. The state estimation device 10 and the state estimation method of the present embodiment can obtain the similar effects to those of the above-described embodiments, which are provided by the common configuration or the equivalent configuration to the above-described embodiments.

Further, the state estimation device 10 of the present embodiment has the following features.

(1) The state estimation device 10 includes the abnormality determination unit 31 that determines whether there is the abnormal situation where it is difficult for the capture unit 2 to perform its intended function. The correction unit 28 calculates the correction data by removing the bias error from the inertia data when the determination of the abnormality determination unit 31 indicates that the situation is not abnormal. Further, when the determination of the abnormality determination unit 31 indicates the abnormal situation, the correction unit 28 calculates the correction data by removing, instead of the bias error calculated by the calculation unit 26, the bias error estimation value previously stored in the memory 50 from the inertia data. According to this, even when the abnormal situation occurs in which the capture unit 2 cannot perform its intended function, it is possible to appropriately continue the estimation of the state of the vehicle 1, as shown in FIG. 18, for example.

(2) The abnormality determination unit 31 determines whether there is the abnormal situation based on the image data output by the capture unit 2. According to this, since it is not necessary to add a sensor device dedicated to abnormality determination of the capture unit 2, it is possible to continue the estimation of the state of the vehicle 1 in a simple manner.

Fifth Embodiment

Next, a fifth embodiment will be described with reference to FIG. 19. In the present embodiment, differences from the fourth embodiment will be mainly described.

In the abnormal situation where it is difficult for the capture unit 2 to perform its intended function, the preprocessing unit 24 is likely to be not able to extract the feature point FP of the image data or track the feature point FP.

Figure 19:
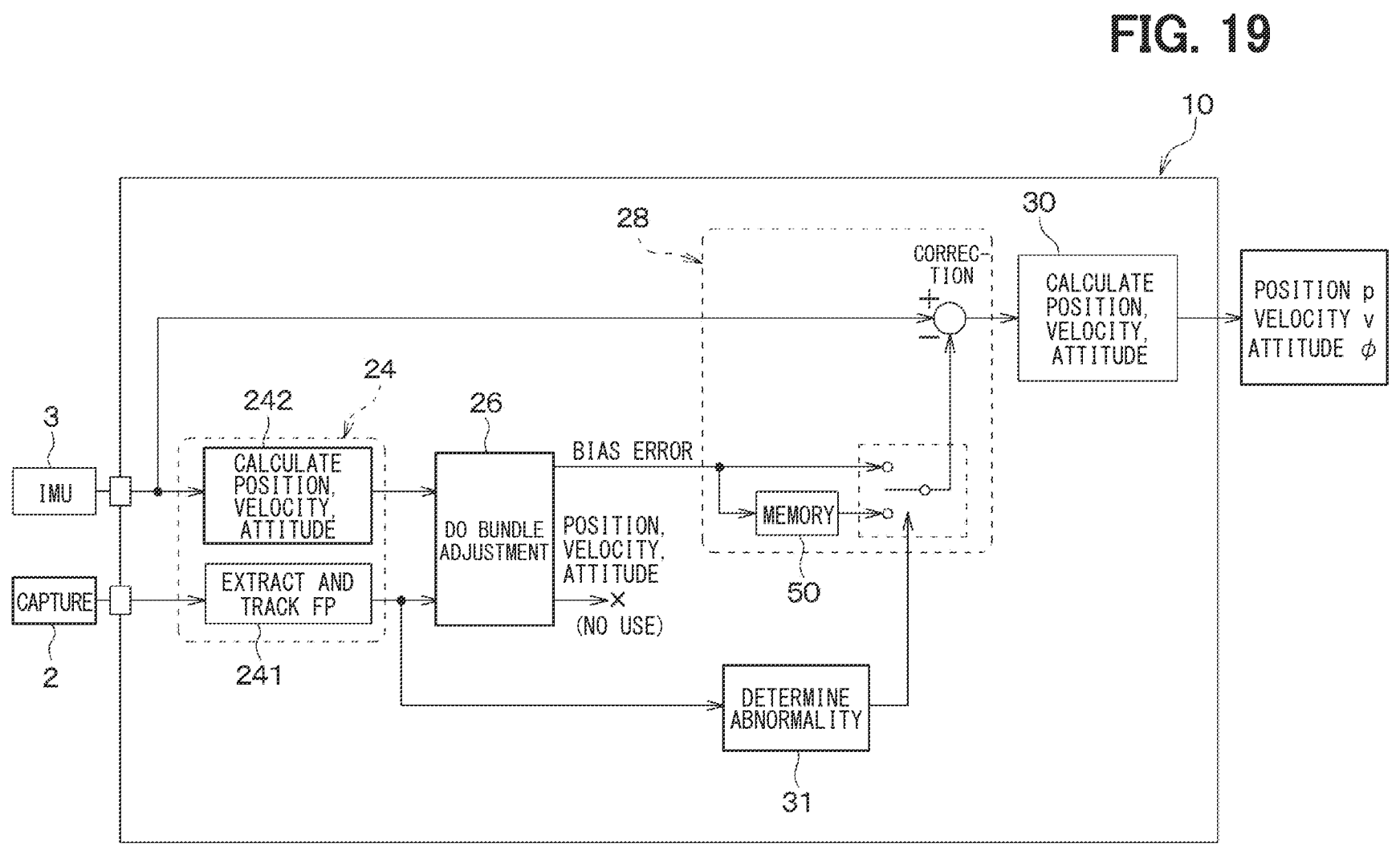

In view of this, the abnormality determination unit 31 of the present embodiment does not acquire image data from the capture unit 2, but acquires the analysis result of the image data from the preprocessing unit 24 as shown in FIG. 19 and determines whether the abnormal situation has occurred based on the analysis result. For example, the abnormality determination unit 31 determines that the abnormal situation has occurred when the preprocessing unit 24 cannot extract the feature point FP of the image data at all or when the tracking of the feature point FP suddenly becomes impossible.

Others are similar to those in the fourth embodiment. The state estimation device 10 and the state estimation method of the present embodiment can obtain similar effects to those of the fourth embodiment, which are provided by the common configuration or the equivalent configuration to the fourth embodiment.

Sixth Embodiment

Next, a sixth embodiment will be described with reference to FIG. 20. In the present embodiment, differences from the fourth embodiment will be mainly described.

In the abnormal situation in which it is difficult for the capture unit 2 to perform its intended function, the accuracy of estimating the attitude φ of the vehicle 1 by the VIO is likely to decrease. Conversely, when the estimation accuracy of the attitude φ of the vehicle 1 by the VIO decreases, the capture unit 2 is likely to be in the abnormal situation where it is difficult to perform its intended function.

Figure 20:
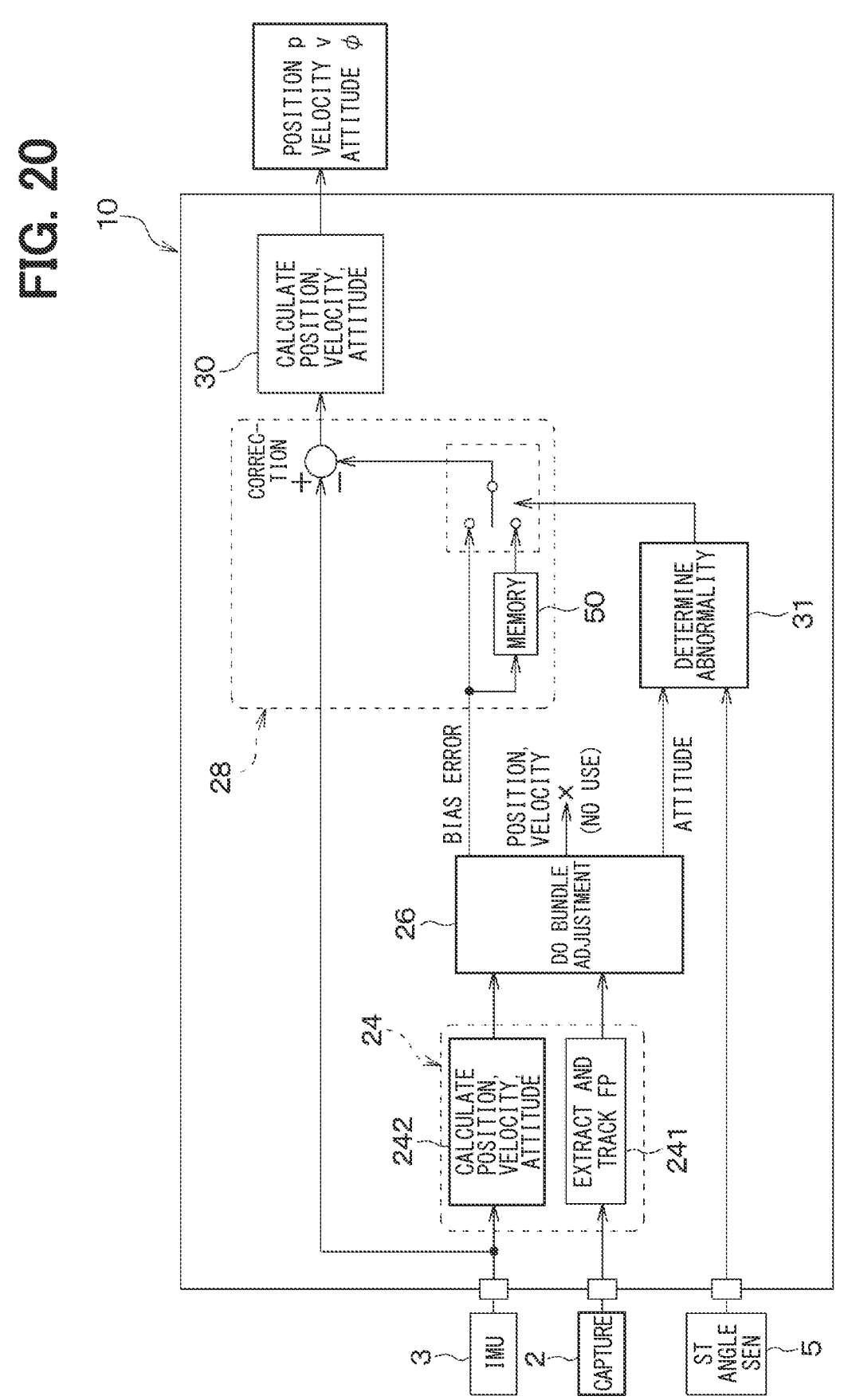
FIG. 20 is an explanatory diagram illustrating a state estimation device according to a sixth embodiment.

In view of this, as shown in FIG. 20, the abnormality determination unit 31 determines whether the capture unit 2 is in the abnormal situation where it is difficult to perform the intended function, based on the sensor output of the steering angle sensor 5 installed on the vehicle 1 and the attitude φ of the vehicle 1 obtained by the calculation unit 26. In the drawings, the steering angle sensor 5 may be also referred to as "ST ANGLE SEN". For example, when the attitude φ of the vehicle 1 obtained from the sensor output of the steering angle sensor 5 and the attitude φ of the vehicle 1 obtained by the calculation unit 26 deviate from each other and the deviation exceeds a reference value, the abnormality determination unit 31 determines that the situation is abnormal.

Others are the similar to those in the fourth embodiment. The state estimation device 10 and the state estimation method of the present embodiment can obtain similar effects to those of the fourth embodiment, which are provided by the common configuration or the equivalent configuration to the fourth embodiment.

Further, the state estimation device 10 of the present embodiment has the following features.

(1) The abnormality determination unit 31 determines whether the capture unit 2 is in the abnormal situation where it is difficult to perform the intended function, based on the sensor output of the steering angle sensor 5 and the attitude φ of the vehicle 1 obtained by the calculation unit 26. In this way, when the sensor output of the steering angle sensor 5 already placed in the vehicle 1 is used to determine whether the abnormal situation has occurred, it is not necessary to add the sensor device dedicated to abnormality determination of the capture unit 2. Therefore, it is possible to continue the estimation of the state of the vehicle 1 in a simple manner.

Seventh Embodiment

Next, a seventh embodiment will be described with reference to FIG. 21. In the present embodiment, differences from the fourth embodiment will be mainly described.

In the abnormal situation in which it is difficult for the capture unit 2 to perform its intended function, the accuracy of estimating the velocity v by the VIO is likely to decrease. Conversely, when the estimation accuracy of the velocity v of the vehicle 1 by the VIO decreases, the capture unit 2 is likely to be in the abnormal situation where it is difficult to perform its intended function.

Figure 21:
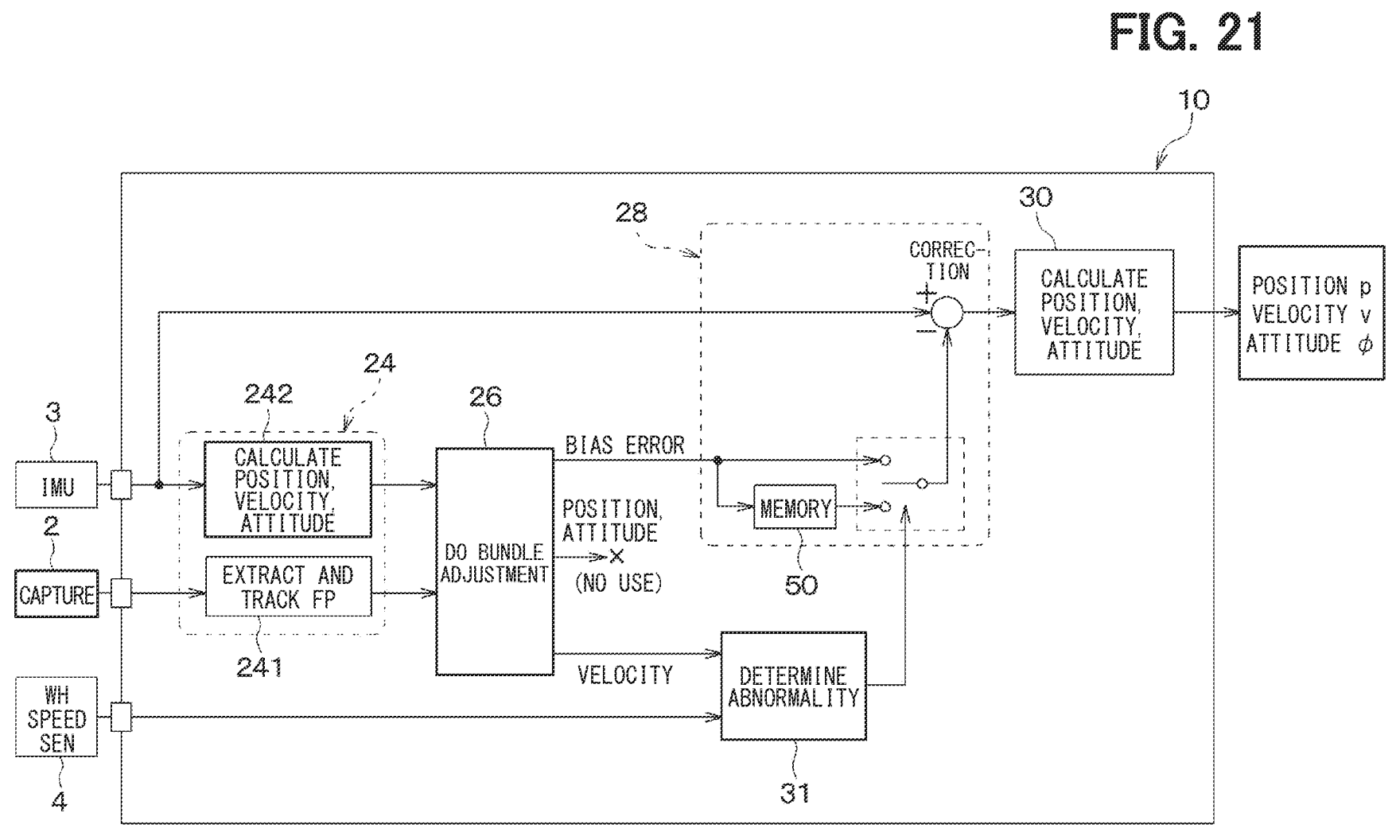

In view of this, as shown in FIG. 21, the abnormality determination unit 31 determines whether the capture unit 2 is in the abnormal situation where it is difficult to perform the intended function, based on the sensor output of the wheel speed sensor 4 installed on the vehicle 1 and the velocity v of the vehicle 1 obtained by the calculation unit 26. For example, when the velocity v of the vehicle 1 obtained from the sensor output of the wheel speed sensor 4 and the velocity v of the vehicle 1 obtained by the calculation unit 26 deviate from each other and the deviation exceeds a reference value, the abnormality determination unit 31 determines that the situation is abnormal. In the drawings, the wheel speed sensor 4 may be also referred to as "WH SPEED SEN".

Others are similar to those in the fourth embodiment. The state estimation device 10 and the state estimation method of the present embodiment can obtain similar effects to those of the fourth embodiment, which are provided by the common configuration or the equivalent configuration to the fourth embodiment.

Further, the state estimation device 10 of the present embodiment has the following features.

(1) The abnormality determination unit 31 determines whether the capture unit 2 is in the abnormal situation where it is difficult to perform the intended function, based on the sensor output of the wheel speed sensor 4 and the velocity v of the vehicle 1 obtained by the calculation unit 26. In this way, when the sensor output of the wheel speed sensor 4 already placed in the vehicle 1 is used to determine whether the abnormal situation has occurred, it is not necessary to add the sensor device dedicated to abnormality determination of the capture unit 2. Therefore, it is possible to continue the estimation of the state of the vehicle 1 in a simple manner.

Eighth Embodiment

Next, an eighth embodiment will be described with reference to FIG. 22. In the present embodiment, differences from the fourth embodiment will be mainly described.

In the abnormal situation in which it is difficult for the capture unit 2 to perform its intended function, the accuracy of estimating the position p, the velocity v, and the attitude φ by the VIO is likely to decrease. Therefore, in the abnormal situation where it is difficult for the capture unit 2 to perform its intended function, the position p, the velocity v, and the attitude φ of the vehicle 1 obtained by the calculation unit 26 and the position p, the velocity v, and the attitude φ of the vehicle 1 estimated by the estimation unit 30 are likely to deviate from each other.

Figure 22:
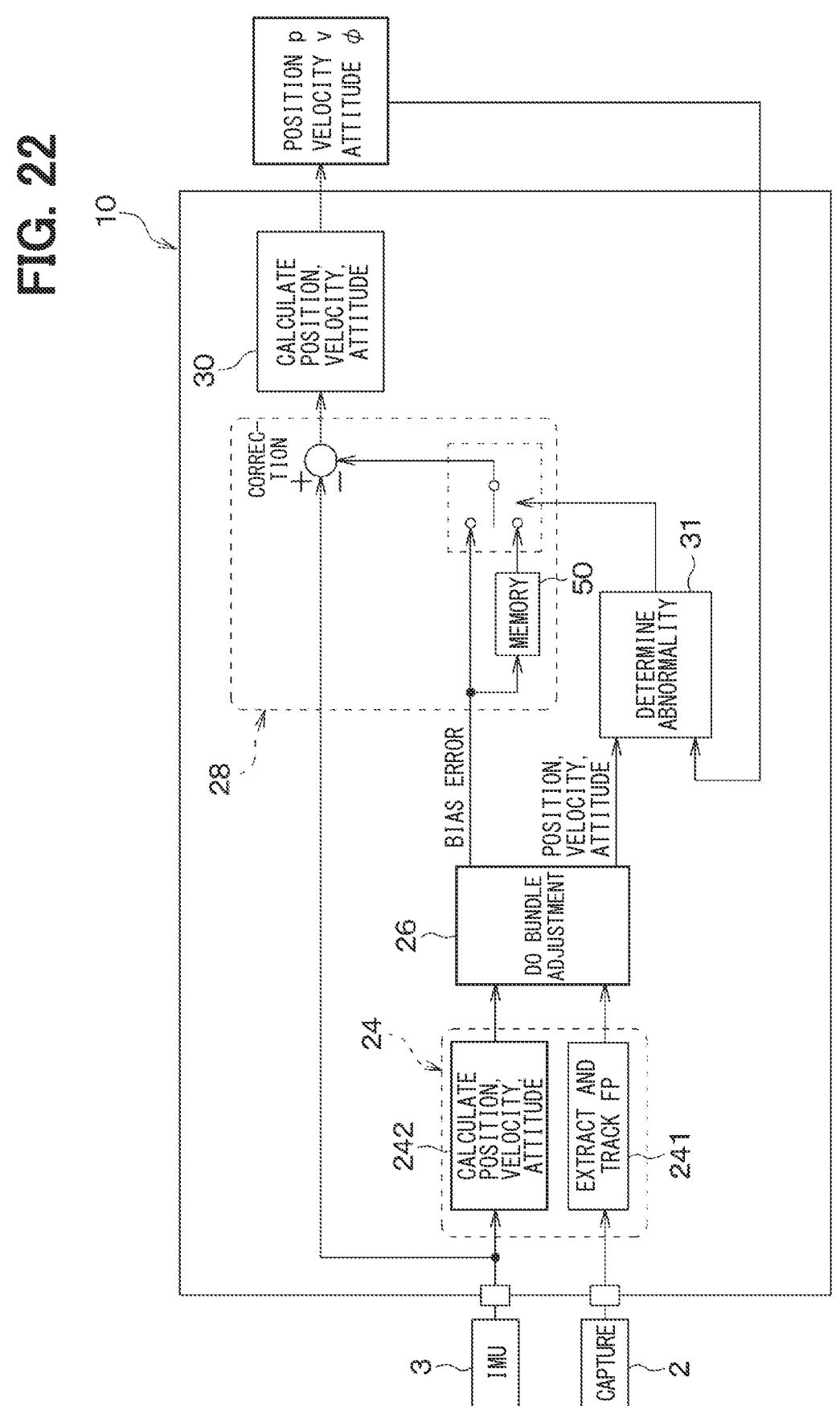
FIG. 22 is an explanatory diagram illustrating a state estimation device according to an eighth embodiment.

In view of this, as shown in FIG. 22, the abnormality determination unit 31 determines whether the capture unit 2 is in the abnormal situation where it is difficult to perform the intended function, based on the position p, the velocity v, and the attitude φ of the vehicle 1 calculated by the calculation unit 26 and the position p, the velocity v, and the attitude φ estimated by the estimation unit 30. For example, the abnormality determination unit 31 determines that the abnormal situation has occurred when at least one of the position p, the velocity v, or the attitude φ of the vehicle 1 calculated by the calculation unit 26 deviates from the position p, the velocity v, or the attitude φ of the vehicle 1 estimated by the estimation unit 30 and the deviation exceeds the reference value.

Others are similar to those in the fourth embodiment. The state estimation device 10 and the state estimation method of the present embodiment can obtain similar effects to those of the fourth embodiment, which are provided by the common configuration or the equivalent configuration to the fourth embodiment.

Further, the state estimation device 10 of the present embodiment has the following features.

(1) The abnormality determination unit 31 determines whether the capture unit 2 is in the abnormal situation where it is difficult to perform the intended function, in other words, determines whether the abnormal situation in which the capture unit 2 is difficult to perform a predetermined function has occurred based on the position p, the velocity v, and the attitude φ of the vehicle 1 calculated by the calculation unit 26 and the position p, the velocity v, and the attitude φ of the vehicle 1 estimated by the estimation unit 30. According to this, since it is not necessary to add a sensor device dedicated to abnormality determination of the capture unit 2, it is possible to continue the estimation of the state of the vehicle 1 in a simple manner.

Ninth Embodiment

Next, a ninth embodiment will be described with reference to FIG. 23. In the present embodiment, differences from the fourth embodiment will be mainly described.

The bias error of the inertial measurement unit 3 has characteristics that change according to the temperature of the inertial measurement unit 3. Therefore, it is preferable that the bias estimation value used when the correction unit

28 calculates the correction data is not a fixed value but a variable value that changes according to the temperature of the inertial measurement unit 3.

Figure 23:
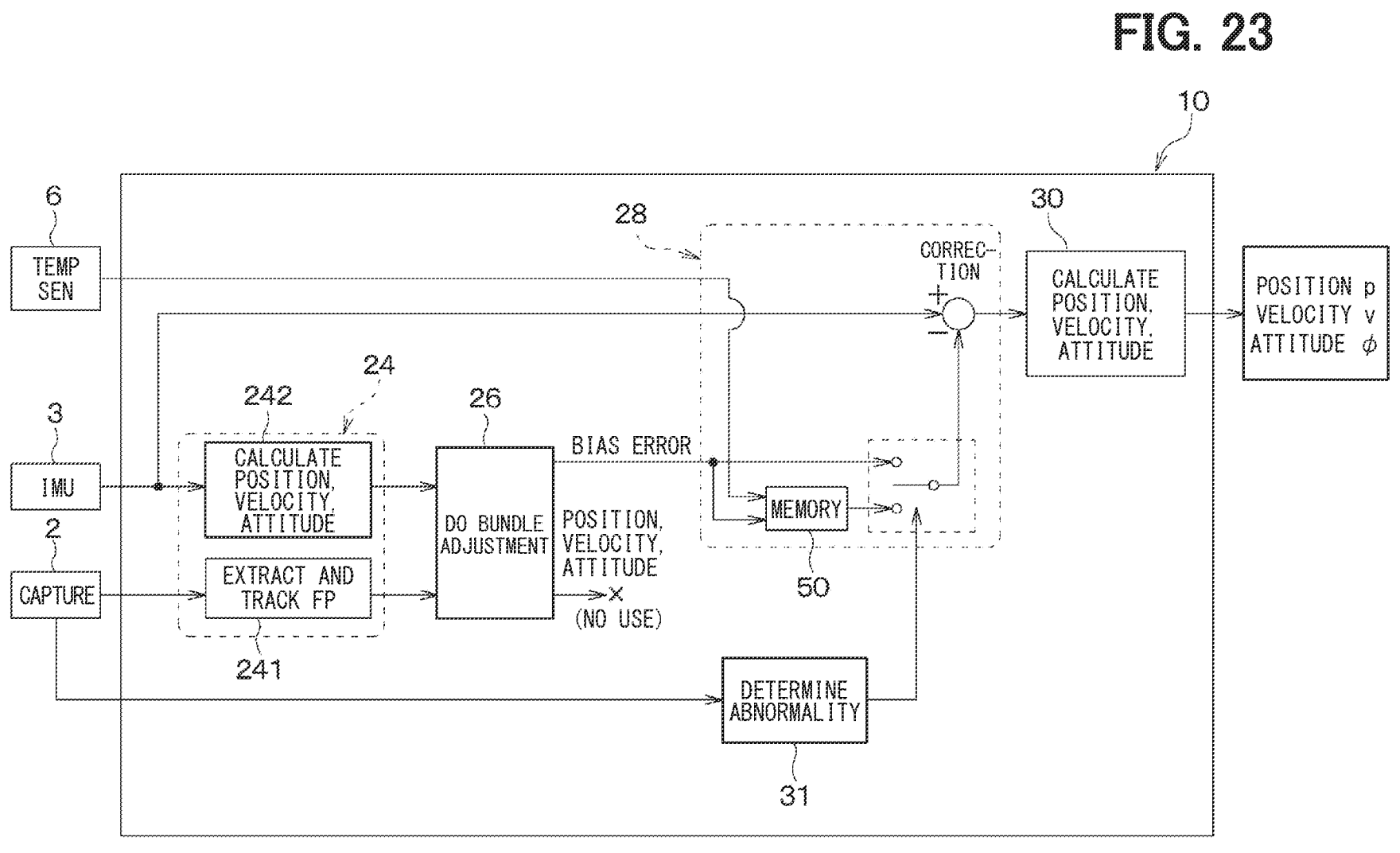

In consideration of this, as shown in FIG. 23, the correction unit 28 corrects the bias estimation value according to the temperature measurement result of the inertial measurement unit 3, and removes the corrected bias estimation value from the inertia data to calculate the correction data. For example, when the bias error tends to increase as the temperature of the inertial measurement unit 3 rises, the correction unit 28 adds a predetermined value to the bias estimation value stored in the memory 50 when the temperature of the inertial measurement unit 3 rises.

Here, the method for measuring the temperature of the inertial measurement unit 3 may be the temperature sensor 6 added to the inertial measurement unit 3, or may be estimation using the outside air temperature and the usage conditions of the inertial measurement unit 3. In the drawing, the temperature sensor 6 may be also referred to as "TEMP SEN". Also, the correction of the bias estimation value is not limited to the one described above, and may be implemented by other methods.

Others are similar to those in the fourth embodiment. The state estimation device 10 and the state estimation method of the present embodiment can obtain similar effects to those of the fourth embodiment, which are provided by the common configuration or the equivalent configuration to the fourth embodiment.

Further, the state estimation device 10 of the present embodiment has the following features.

(1) The correction unit 28 corrects the bias estimation value according to the temperature of the inertial measurement unit 3, and removes the corrected bias estimation value from the inertia data to calculate the correction data. According to this, even when the abnormal situation occurs in which the capture unit 2 cannot perform its intended function, it is possible to continue the estimation of the state of the vehicle 1 in an appropriate manner.

Other Embodiments

Although the representative embodiments of the present disclosure have been described above, the present disclosure is not limited to the embodiments and can be variously modified as follows, for example.

Although the state estimation device 10 of the above embodiments is applied to the vehicle 1, the present disclosure is not limited to this. The state estimation device 10 can be applied to a mobile object other than the vehicle 1.

Although the state estimation device 10 of the above embodiments estimates the position p, the velocity v, and the attitude φ of the vehicle 1, the present disclosure is not limited to this. The state estimation device 10 may estimate a state including some of the position p, the velocity v, or the attitude φ of the vehicle 1.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, it is not limited to the shape, positional relationship, and the like, except for the case where it is specifically specified, the case where it is fundamentally limited to a specific shape, positional relationship, and the like, and the like.

The controller and the method described in the present disclosure may be implemented by a special purpose computer, which includes a memory and a processor programmed to execute one or more special functions implemented by computer programs of the memory. The controller and the method described in the present disclosure may be implemented by a special purpose computer including a processor with one or more dedicated hardware logic circuits. The controller and the method described in the present disclosure may be implemented by a combination of (i) a special purpose computer including a processor programmed to execute one or more functions by executing a computer program and a memory and (ii) a special purpose computer including a processor with one or more dedicated hardware logic circuits. The computer program may be stored in a computer-readable non-transitory tangible storage medium as instructions to be executed by a computer.

The invention claimed is:

1. A state estimation device for estimating a state including at least one of a position, a velocity, or an attitude of a mobile object, the state estimation device comprising:

at least one processor configured to read image data which is output by a camera configured to capture an image of a peripheral area of the mobile object and inertia data of the mobile object, the inertia data being output from an inertial measurement unit installed on the mobile object;

perform preprocessing to extract a feature point included in the image data, track the feature point, and calculate the position, the velocity, or the attitude of the mobile object by performing inertia processing on the inertia data;

calculate a bias error of the inertial measurement unit by performing bundle adjustment on the feature point of the image data, the position, the velocity, or the attitude of the mobile object based on the inertia data;

calculate correction data by removing the bias error from the inertia data on which the inertia processing is not performed; and estimate a state including at least one of the position, the velocity, or the attitude of the mobile object based on the correction data.

2. The state estimation device according to claim 1, wherein the at least one processor is configured to estimate the velocity of the mobile object based on the correction data and a sensor output of a vehicle wheel sensor installed on the mobile object, and estimate the position of the mobile object based on an estimated speed of the mobile object.

3. The state estimation device according to claim 2, wherein the inertial measurement unit includes a gyro sensor that detects an angular velocity of the mobile object and an acceleration sensor that detects an acceleration of the mobile object, and the at least one processor is configured to calculate a first attitude angle indicating an attitude angle of the mobile object based on a result obtained by correction of a sensor output of the gyro sensor, the correction being performed by the at least one processor, calculate a second attitude angle indicating an attitude of the mobile object based on a gravitational acceleration calculated using a result obtained by correction of a sensor output of the acceleration sensor by the at least one processor and a sensor output of a wheel speed sensor of the mobile object, pass the first attitude angle through a high-pass filter of a complementary filter and passes the second attitude angle through a low-pass filter of the complementary filter, and after passing the first attitude angle and the second attitude angle, synthesize the first attitude angle and the second attitude angle to estimate the attitude of the mobile object.

4. The state estimation device according to claim 1, the at least one processor is further configured to determine whether an abnormal situation where the camera has difficulty performing a predetermined function has occurred, wherein the at least one processor calculates the correction data by removing the bias error from the inertia data on which the inertia processing is not performed when the abnormal situation has not occurred, and calculates the correction data by removing, instead of the bias error which was calculated by the at least one processor, a bias error estimation value stored in a memory in advance from the inertia data on which the inertia processing is not performed when the abnormal situation has occurred.

5. The state estimation device according to claim 4, wherein the at least one processor is configured to determine whether the abnormal situation has occurred based on the image data.

6. The state estimation device according to claim 4, wherein the at least one processor is configured to determine whether the abnormal situation has occurred based on a sensor output of a steering angle sensor installed on the mobile object and the attitude of the mobile object, the attitude being calculated by the at least one processor.

7. The state estimation device according to claim 4, wherein the at least one processor is configured to determine whether the abnormal situation has occurred based on a sensor output of a vehicle wheel speed sensor installed on the mobile object and a speed of the mobile object, the speed being calculated by the at least one processor.

8. The state estimation device according to claim 4, wherein the at least one processor is configured to determine whether the abnormal situation has occurred based on the position, the velocity, and the attitude calculated by the at least one processor and the position, the velocity, and the attitude estimated by the at least one processor.

9. The state estimation device according to claim 4, wherein the at least one processor is configured to correct the bias error estimation value according to a temperature of the inertial measurement unit, and calculate the correction data by removing the bias error estimation value which is corrected from the inertia data on which the inertia processing is not performed.

10. The state estimation device according to claim 1, wherein the bundle adjustment is a nonlinear least-squares method, and the at least one processor is configured to optimize a residual of the image data which is output from the camera and a residual of the image data by the bundle adjustment to calculate the bias error.

11. The state estimation device according to claim 1, wherein the inertia processing integrates the inertia data, and the inertia processing is performed before the bias error is calculated.

12. A state estimation method for estimating a state including at least one of a position, a velocity, or an attitude of a mobile object, the state estimation method comprising:

reading image data which is output by a camera configured to capture an image of a peripheral area of the mobile object and inertia data of the mobile object, the inertia data being output from an inertial measurement unit installed on the mobile object;

extracting a feature point included in the image data;

tracking the feature point;

calculating the position, the velocity, or the attitude of the mobile object by performing inertia processing on the inertia data;

calculating a bias error of the inertial measurement unit by performing bundle adjustment on the feature point of the image data and the position, the velocity, and the attitude of the mobile object based on the inertia data;

calculating correction data by removing the bias error from the inertia data on which the inertia processing is not performed; and estimating a state including at least one of the position, the velocity, or the attitude of the mobile object based on the correction data.

13. The state estimation method according to claim 12, further comprising estimating the velocity of the mobile object based on the correction data and a sensor output of a vehicle wheel sensor installed on the mobile object, and estimating the position of the mobile object based on an estimated speed of the mobile object.

14. The state estimation method according to claim 13, wherein the inertial measurement unit includes a gyro sensor that detects an angular velocity of the mobile object and an acceleration sensor that detects an acceleration of the mobile object, the state estimation method further comprising calculating a first attitude angle indicating an attitude angle of the mobile object based on a result obtained by correction of a sensor output of the gyro sensor, calculating a second attitude angle indicating an attitude of the mobile object based on a gravitational acceleration calculated using a result obtained by correction of a sensor output of the acceleration sensor and a sensor output of a wheel speed sensor of the mobile object, passing the first attitude angle through a high-pass filter of a complementary filter and passing the second attitude angle through a low-pass filter of the complementary filter, and after passing the first attitude angle and the second attitude angle, synthesizing the first attitude angle and the second attitude angle to estimate the attitude of the mobile object.

15. The state estimation method according to claim 12, further comprising determining whether an abnormal situation where the camera has difficulty performing a predetermined function has occurred, wherein the correction data is calculated by removing the bias error from the inertia data on which the inertia processing is not performed when the abnormal situation has not occurred, and the correction data is calculated by removing, instead of the bias error which is calculated, a bias error estimation value stored in a memory in advance from the inertia data on which the inertia processing is not performed when the abnormal situation has occurred.

16. The state estimation method according to claim 15, further comprising determining whether the abnormal situation has occurred based on the image data.

17. The state estimation method according to claim 15, further comprising determining whether the abnormal situation has occurred based on a sensor output of a steering angle sensor installed on the mobile object and the attitude of the mobile object, the attitude being calculated.

18. The state estimation method according to claim 15, further comprising determining whether the abnormal situation has occurred based on a sensor output of a vehicle wheel speed sensor installed on the mobile object and a speed of the mobile object, the speed being calculated.

19. The state estimation method according to claim 15, further comprising determining whether the abnormal situation has occurred based on the position, the velocity, and the attitude which are calculated and the position, the velocity, and the attitude which are estimated.

20. The state estimation method according to claim 15, further comprising correcting the bias error estimation value according to a temperature of the inertial measurement unit, and calculating the correction data by removing the bias error estimation value which is corrected from the inertia data on which the inertia processing is not performed.

21. The state estimation method according to claim 12, wherein the bundle adjustment is a nonlinear least-squares method, and the state estimation method further comprises optimizing a residual of the image data which is output from the camera and a residual of the image data by the bundle adjustment to calculate the bias error.

* * * * *